United States Patent
Carter et al.

(10) Patent No.: US 11,019,283 B2
(45) Date of Patent: May 25, 2021

(54) AUGMENTING DETECTED REGIONS IN IMAGE OR VIDEO DATA

(71) Applicant: GumGum, Inc., Santa Monica, CA (US)

(72) Inventors: Cambron Neil Carter, Venice, CA (US); Daniel James McKenna, Santa Monica, CA (US); Iris Wing Yin Fu, Los Angeles, CA (US); Divyaa Ravichandran, Los Angeles, CA (US)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 16/249,635

(22) Filed: Jan. 16, 2019

(65) Prior Publication Data
US 2019/0222776 A1    Jul. 18, 2019

Related U.S. Application Data

(60) Provisional application No. 62/619,025, filed on Jan. 18, 2018.

(51) Int. Cl.
*H04N 5/272* (2006.01)
*G06K 9/00* (2006.01)
(Continued)

(52) U.S. Cl.
CPC ......... *H04N 5/272* (2013.01); *G06K 9/00369* (2013.01); *G06K 9/00724* (2013.01);
(Continued)

(58) Field of Classification Search
None
See application file for complete search history.

(56) References Cited

U.S. PATENT DOCUMENTS

| | | | | |
|---|---|---|---|---|
| 5,892,554 | A * | 4/1999 | DiCicco | H04N 5/2723 348/584 |
| 8,649,592 | B2 * | 2/2014 | Nguyen | G06K 9/38 382/154 |

(Continued)

FOREIGN PATENT DOCUMENTS

| | | |
|---|---|---|
| CN | 106412643 | 2/2017 |
| WO | WO 97/00582 | 1/1997 |

OTHER PUBLICATIONS

Abadi, M., et al..: TensorFlow: Large-scale machine learning on heterogeneous systems (2015) Software available from tensorflow.org.

(Continued)

*Primary Examiner* — Gelek W Topgyal
(74) *Attorney, Agent, or Firm* — Knobbe, Martens, Olson & Bear, LLP

(57) ABSTRACT

Systems and methods are provided for identifying one or more portions of images or video frames that are appropriate for augmented overlay of advertisement or other visual content, and augmenting the image or video data to include such additional visual content. Identifying the portions appropriate for overlay or augmentation may include employing one or more machine learning models configured to identify objects or regions of an image or video frame that meet criteria for visual augmentation. The pose of the augmented content presented within the image or video frame may correspond to the pose of one or more real-world objects in the real world scene captured within the original image or video.

20 Claims, 17 Drawing Sheets

(51) Int. Cl.
  *G06T 7/70* (2017.01)
  *G06T 7/50* (2017.01)
  *G06T 7/20* (2017.01)
  *G06Q 30/02* (2012.01)
  *G06T 19/00* (2011.01)
  *H04N 21/2668* (2011.01)
  *H04N 21/81* (2011.01)
(52) U.S. Cl.
  CPC .......... *G06Q 30/0252* (2013.01); *G06T 7/20* (2013.01); *G06T 7/50* (2017.01); *G06T 7/70* (2017.01); *G06T 19/006* (2013.01); *G06T 2207/10016* (2013.01); *G06T 2207/20081* (2013.01); *G06T 2207/30196* (2013.01); *G06T 2207/30221* (2013.01); *G06T 2207/30244* (2013.01); *H04N 21/2668* (2013.01); *H04N 21/812* (2013.01)

(56) References Cited

U.S. PATENT DOCUMENTS

| | | | | |
|---|---|---|---|---|
| 9,881,207 | B1* | 1/2018 | Nguyen | G06K 9/00369 |
| 2008/0007567 | A1* | 1/2008 | Clatworthy | G06Q 30/02 345/619 |
| 2008/0077953 | A1* | 3/2008 | Fernandez | H04N 7/15 725/32 |
| 2010/0122286 | A1* | 5/2010 | Begeja | G06Q 30/02 725/34 |
| 2011/0106595 | A1* | 5/2011 | Vande Velde | G06Q 30/02 705/14.4 |
| 2013/0063561 | A1* | 3/2013 | Stephan | H04N 13/302 348/46 |
| 2014/0363143 | A1* | 12/2014 | Dharssi | G06K 9/00765 386/282 |
| 2015/0297949 | A1* | 10/2015 | Aman | G06F 16/70 348/157 |
| 2016/0028968 | A1* | 1/2016 | Affaticati | H04N 5/2723 348/47 |
| 2016/0065864 | A1* | 3/2016 | Guissin | G06T 5/008 348/239 |
| 2016/0132755 | A1* | 5/2016 | Ikeda | G06N 20/00 382/159 |
| 2017/0278289 | A1* | 9/2017 | Marino | G06T 7/44 |
| 2019/0172238 | A1* | 6/2019 | Miao | G06T 11/60 |
| 2019/0205649 | A1* | 7/2019 | Ananthanarayanan | G06K 9/00711 |

OTHER PUBLICATIONS

Alcantarilla, P.F., Bartoli, A., Davison, A.J.: Kaze features. In: Proc. of the 12th European Conf. on Computer Vision (ECCV). vol. 4 of ECCV'12., Berlin, Heidelberg, Springer-Verlag (2012) 214-227.
Bay, H., Ess, A., Tuytelaars, T., Van Gool, L.: Speeded-up robust features (surf). Computer Vision Image Understanding 110 (2008) 346-359.
Canny, J.: A computational approach to edge detection. IEEE Trans. on Pattern Analysis and Machine Intelligence 8 (1986) 679-698.
Chang, C.H., Hsieh, K.Y., Chung, M.C., Wu, J.L.: ViSA: Virtual spotlighted advertising. In: Proc. of the 16th ACM Int. Conf. on Multimedia. (2008) 837-840.
Chang, C.H., Hsieh, K.Y., Chiang, M.C., Wu, J.L.: Virtual spotlighted advertising for tennis videos. J. Visual Commun. and Image Representation 21 (2010) 595-612.
Collobert, R., Kavukcuoglu, K., Farabet, C.: Torch7: A matlab-like environment for machine learning. In: BigLearn, NIPS Workshop. (2011).
Cordts, M., Omran, M., Ramos, S., Rehfeld, T., Enzweiler, M., Benenson, R., Franke, U., Roth, S., Schiele, B.: The cityscapes dataset for semantic urban scene understanding. In: Proc. of the IEEE Conf. on Computer Vision and Pattern Recognition (CVPR). (2016).
Duda, R.O., Hart, P.E.: Use of the hough transformation to detect lines and curves in pictures. Commun. ACM 15 (1972) 11-15.
Everingham, M., Van Gool, L., Williams, C.K.I., Winn, J., Zisserman, A.: The PASCAL Visual Object Classes Challenge 2012 (VOC2012) Results. http://host.robots.ox.ac.uk/pascal/VOC/voc2012/ (2012).
Fischler, M.A., Bolles, R.C.: Random sample consensus: A paradigm for model fitting with applications to image analysis and automated cartography. Commun. ACM 24 (1981) 381-395.
Han, J., de With, P.H.N. 3-D camera modeling and its applications in sports broadcast video analysis. In: Multimedia Content Analysis and Mining, Berlin, Heidelberg, Springer Berlin Heidelberg (2007) 434-443.
Hartley, R., Zisserman, A.: Multiple View Geometry in Computer Vision. 2 edn. Cambridge University Press, New York, NY, USA (2003), pp. v-21.
Kalman, R.: A new approach to linear filtering and prediction problems. J. of Basic Engineering (ASME) 82D (1960) 35-45.
Kang, Kai et al., "Fully Convolutional Neural Networks for Crowd Segmentation", The Chinese University of Hong Kong, Nov. 17, 2014.
Li, Y., Wan, K.W., Yan, X., Xu, C.: Real time advertisement insertion in baseball video based on advertisement effect. In: Proc. of the 13th Annual ACM Int. Conf. on Multimedia. (2005) 343-346.
Snavely, N.: Megadepth: Learning single-view depth prediction from internet photos. In: Proc. of the IEEE Conf. on Computer Vision and Pattern Recognition (CVPR). (2018).
Liu, H., Qiu, X., Huang, Q., Jiang, S., Xu, C.: Advertise gently—in-image advertising with low intrusiveness. 16th IEEE Int. Conf. on Image Process. (ICIP)(2009) 3105-3108.
Lowe, D.G.: Distinctive image features from scale-invariant keypoints. Int. J. Computer Vision 60 (2004) 91-110.
Lucas, B.D., Kanade, T.: An iterative image registration technique with an application to stereo vision. In: Proc. of the $7^{th}$ Int. Joint Conf. on Artificial Intelligence.
Medioni, G., Guy, G., Rom, H., Franois, A.: Real-time billboard substitution in a video stream. In De Natale, F., Pupolin, S., eds.: Multimedia Commun., Springer London (1999) 71-84.
Mei, T., Hua, X.S., Li, S.: Contextual in-image advertising. In: Proc. of the 16th ACM Int. Conf. on Multimedia, ACM (2008) 439-448.
Mei, T., Guo, J., Hua, X.S., Liu, F.: Adon: Toward contextual overlay in-video advertising. Multimedia Syst. 16 (2010) 335-344.
Russakovsky, O., Deng, J., Su, H., Krause, J., Satheesh, S., Ma, S., Huang, Z., Karpathy, A., Khosla, A., Bernstein, M., Berg, A.C., Fei-Fei, L.: ImageNet Large Scale Visual Recognition Challenge. Int J. of Computer Vision (IJCV) 115 (2015) 211-252.
Sturm, P., Triggs, B.: A factorization based algorithm for multi-image projective structure and motion. In: Proc. of the 4th European Conf. on Computer Vision (ECCV). ECCV '96, Berlin, Heidelberg, Springer Berlin Heidelberg (1996) 709-720.
Wan, K.W., Xu, C.: Automatic content placement in sports highlights. 2006 IEEE Int. Conf. on Multimedia and Expo (2006) 1893-1896.
Xu, C., Wan, K.W., Bui, S.H., Tian, Q.: Implanting virtual advertisement into broadcast soccer video. In: Adv. In Multimedia Inf. Process.—PCM 2004, Springer Berlin Heidelberg (2005) 264-271.
Yildrim, Y.: Shotdetection. https://github.com/yasinyildirim/ShotDetection (available 2015) (as accessed Apr. 25, 2019).
Zhao, H., Shi, J., Qi, X., Wang, X., Jia, J.: Pyramid scene parsing network. In: Proc. of the IEEE Conf. on Computer Vision and Pattern Recognition (CVPR) (2017).
Zhou, B., Zhao, H., Puig, X., Fidler, S., Barriuso, A., Torralba, A.: Scene parsing through ade20k dataset. In: Proc. of the IEEE Conf. on Computer Vision and Pattern Recognition (CVPR). (2017).
Zhou, B., Zhao, H., Puig, X., Xiao, T., Fidler, S., Barriuso, A., Torralba, A.: Semantic understanding of scenes through the ade20k dataset. Int. J. of Computer Vision (2018).
PCT Search Report and Written Opinion for Application No. PCT/US2019/013848, dated Apr. 1, 2019.

* cited by examiner

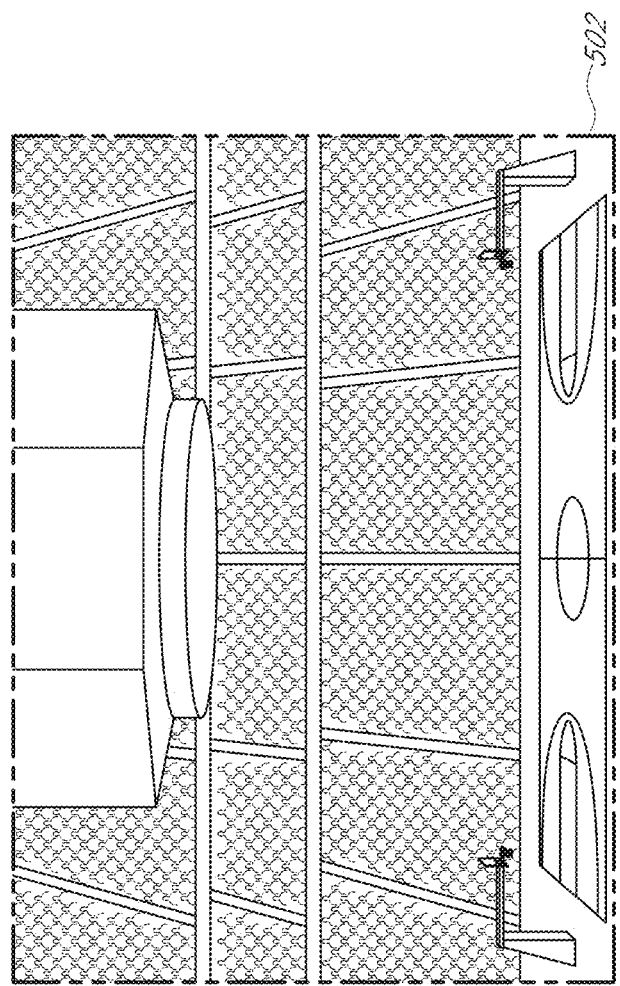

AUGMENTING DETECTED REGIONS IN IMAGE OR VIDEO DATA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/619,025 entitled "AUGMENTING DETECTED REGIONS IN IMAGE OR VIDEO DATA" filed Jan. 18, 2018, which is hereby incorporated by reference in its entirety herein.

BACKGROUND

It is common for companies to sponsor sporting events or to otherwise place their advertisements within a sports arena. For example, a company may contract with a party having rights in an arena, team or league to place a banner within a stadium during game days, to place a logo on a team jersey, to have an advertisement placed on physical signage or displayed on digital signage within a stadium, etc. Some systems may dynamically insert digital advertisements in a sporting event's television broadcast by placing within the arena physical signage of a certain color or known content that can then be replaced in post-processing (such as via chroma key compositing) of the recorded video prior to television broadcast. Other existing systems use infrared or other radiation that is reflected from or generated by existing in-arena physical signage and detected at a location of a camera filming the event in order to detect locations of signage to be digitally replaced before television broadcast or Internet distribution of the captured video.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 5A depicts a sample frame of television broadcast video from a basketball game.

DETAILED DESCRIPTION

Figure 1A:
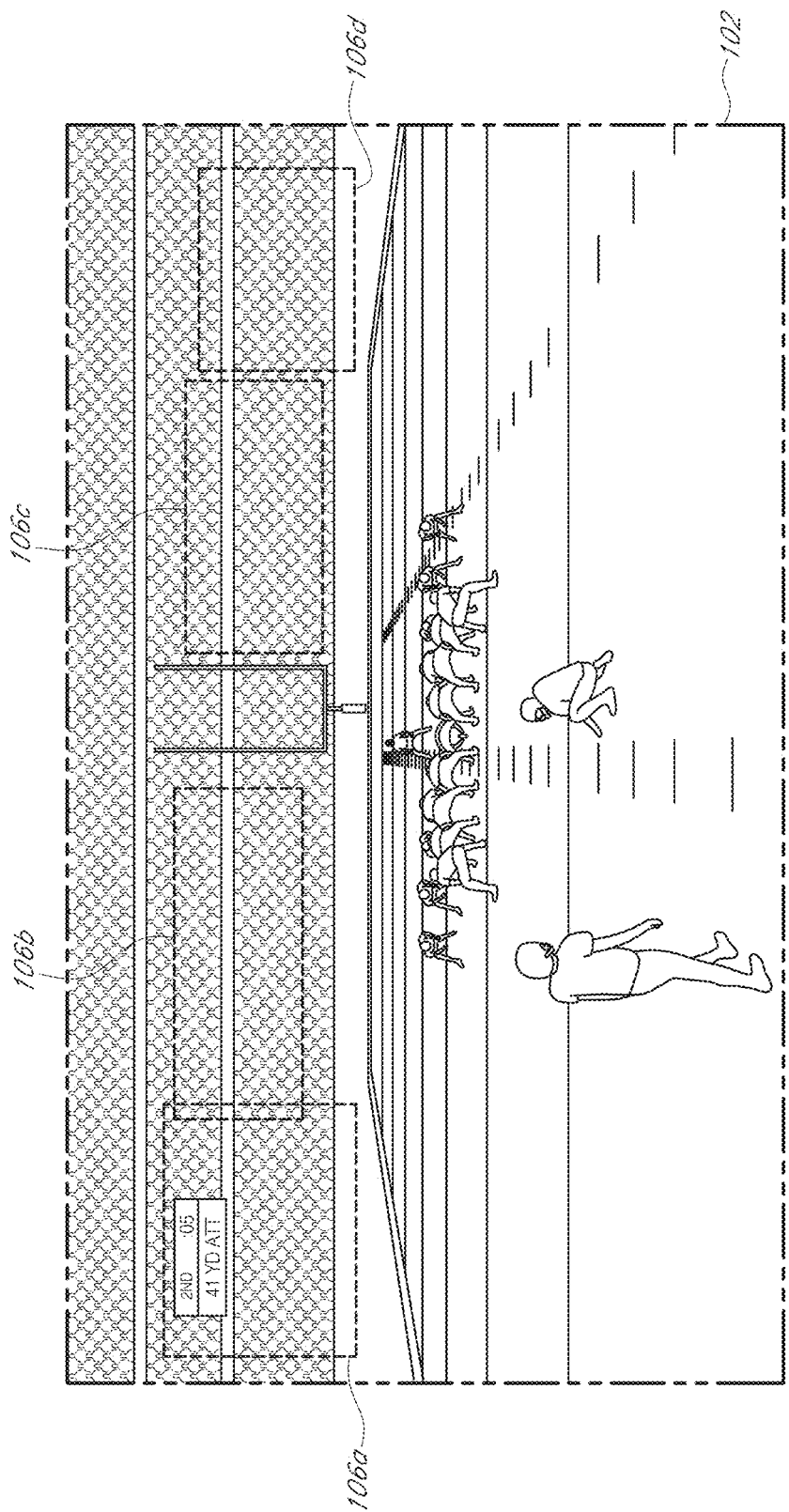
FIG. 1A depicts detected crowd regions in a frame of event video.

Aspects of the present disclosure relate to a computing system and associated methods for identifying portions of images or videos that are appropriate for augmented overlay of advertisement or other visual content, and augmenting the image or video data to include such additional visual content. One or more augmentation-safe or augmentation-appropriate portions of an image or video frame may be determined based on an automated analysis of an image or individual frames of video data using computer vision techniques. Such techniques may include employing machine learning models configured to identify objects or regions of an image or video frame that meet criteria for visual augmentation that may be set in a variety of manners that will be described herein.

As one example according to one embodiment, advertisement content may be displayed over regions or portions of individual video frames that are determined or predicted to be considered negative space (such as from the perspective of a rights holder in the underlying content). The negative space may be, in one example, portions of the audience or crowd in a basketball arena that are viewable in the background of a video shot (such as television broadcast footage of the game that focuses on the on-court action). The crowd portions may be deemed negative space, in some instances, at least in part because such portions are not likely to be the primary focus of a human viewer (e.g., they are not part of the in-game action on the basketball court). Furthermore, overlaying supplemental content within such portions is not likely to interfere with viewing of other in-venue signage or other content that a rights holder would like to remain visible in the shot.

In some embodiments, candidate ad-appropriate regions such as crowds, background landscape, sky, portions of ground, and/or other types of objects or areas appearing in video may be presented to a user (such as a rights holder associated with game footage, a venue, a team, a sponsor, etc.). For example, a computing system may analyze game footage broadcast on television or posted to social media to identify underutilized areas of the video frames (such as in-venue space, like crowds, that appears in the video and is not the focus of the action or foreground of the video). The computing system may then present a user interface for display to a rights holder that provides a labeled example (such as using a bounding box or other visual indicator) of such a region in a sample image or video portion. For example, the user interface may include a message such as "On your team's social media posts, our system has detected 30% negative space that may be currently underutilized and appropriate for augmentation." If a certain type of candidate region is approved by the user as ad-appropriate, a computing system may then apply advertisement augmentation or other visual augmentation in some such areas within subsequently processed video footage using automated computer vision techniques that identify additional instances of such objects or areas, as will be described below.

The augmentation content discussed herein is not limited to advertisement or sponsored content, but may alternatively be content inserted for entertainment value (e.g. to add humor or commentary with respect to the underlying original video content) or information purposes (e.g., to label an on-screen object, such as a player or vehicle, or to provide game statistics or other supplemental information). Similarly, a user approving such augmentation may include users other than a rights holder (where a rights holder may be a venue, team, league, sponsor, etc.), in some embodiments, such as an individual fan that inserts entertaining augmentation content in a video clip that the user posts to a social networking service or video sharing service. Furthermore, in other embodiments, a region appearing in image or video may be deemed ad-appropriate based on automated rules and models that are applied to the content without explicit user approval or other human input. For example, rules and machine learning models may be established during a training process, then subsequently applied automatically to a wide variety of incoming videos without human involvement subsequent to the initial training phase.

Aspects of the present disclosure provide significant technical advantages over prior video augmentation methods. In addition to the novel techniques described herein with respect to identification of negative space or other unique types of candidate regions for augmentation, features described herein may be applied to video that was captured by any camera without other in-venue equipment or recorded data regarding the camera's actual real-world positioning within the venue. For example, aspects of the present disclosure enable automated overlaying of augmentation content within certain areas of video footage or image content without requiring the use of any particular equipment at the location of filming beyond a single camera of any type that may be located anywhere that a cameraperson desires, in one embodiment.

In contrast to certain systems and methods described herein, prior methods of augmenting video of sporting events often rely on video capture limitations that are not present according to at least some embodiments of the present disclosure. Such video capture limitations of some existing systems include requiring multiple cameras (such as to determine depth information or otherwise track a real world location of an object in the video). Other video capture limitations of some existing systems require that the camera is placed at a specific fixed location within a venue (such that a computing system that will augment the content has prior knowledge of the in-venue scene and layout, the position of an augmentation area within the frame, etc.). Other video capture limitations of some existing systems require that the object or area to be augmented has a very specific appearance (e.g., is a certain color that can be treated similarly to a "green screen" for chroma key compositing). Further video capture limitations of other existing systems include that hardware or other equipment besides the camera either provides information regarding the physical layout or position of real-world objects, or detects radiation or signals reflected from or generated by the real-world object to be augmented (e.g., a device at the camera's location or included within the camera detecting radiation that was reflected from in-venue signage for the purpose of aiding in locating the in-frame position of the signage). In some embodiments, aspects of the present disclosure overcome all of the above limitations and enable the augmentation described herein without reliance on any particular in-venue setup or any non-traditional camera equipment.

Figure 1B:
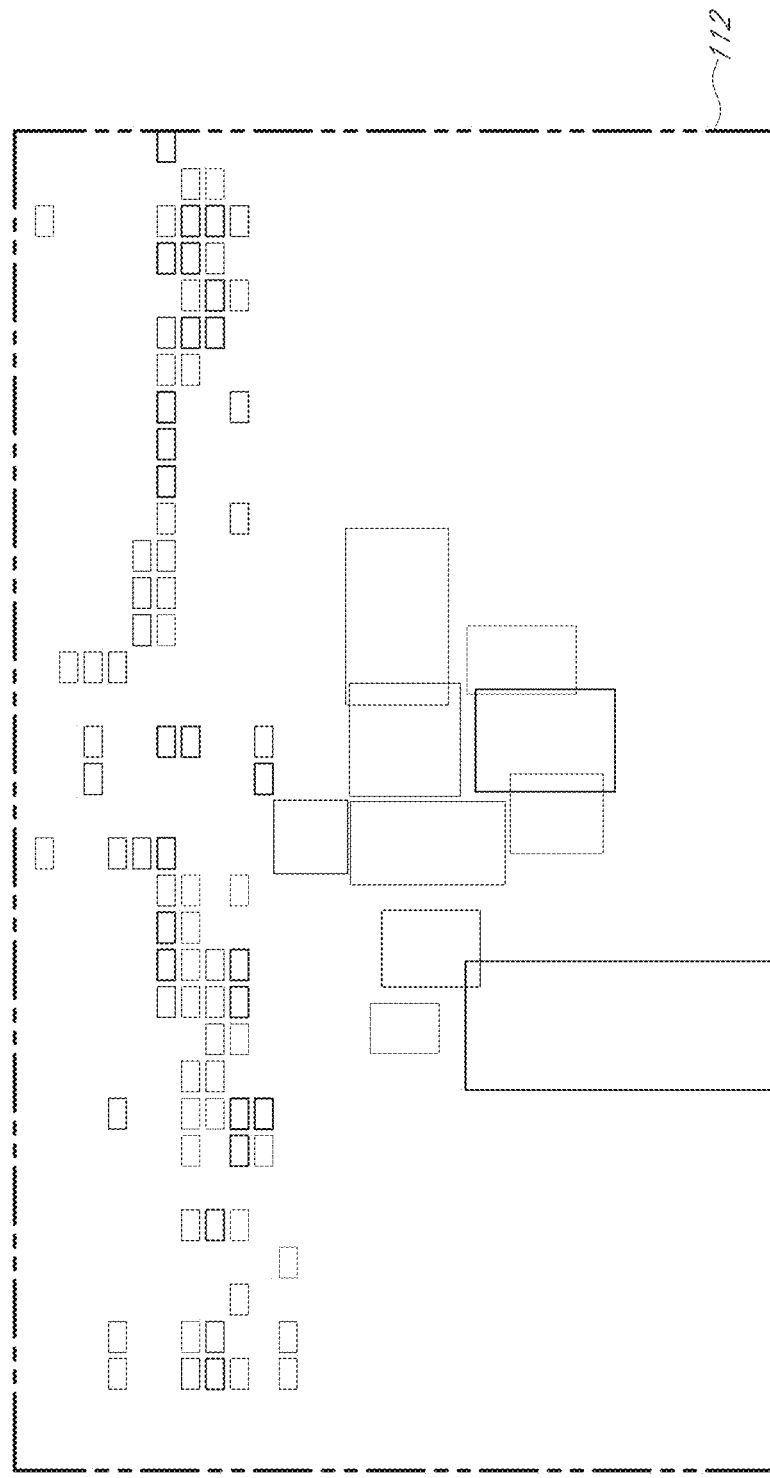
FIG. 1B depicts a graphical representation of a heat map corresponding to FIG. 1A generated from an analysis of the video data.

FIG. 1A depicts detected crowd regions 106a-106d in a frame 102 of event video, while FIG. 1B depicts a corresponding heat map 112 generated from an analysis of the video data. While video frame 102 is illustrated in black and white line drawing form, as are other example video frames that will be described below with respect to other figures, such figures are intended to represent color video frames captured by a video camera filming a real world scene. In the example of frame 102, for instance, the captured scene may be a professional football game, and the frame 102 may be part of a television broadcast of the game. The bounding boxes around crowd regions 106a-106d may be determined by a computing system as described herein. Annotated frame 102 and heat map 112 have been generated to illustrate intermediary results determined by the computing system during an augmentation process, and would not typically be included in a final output video for broadcast or distribution to end-users or viewers. The heat map 112 includes shaded rectangular regions that may represent the system's confidence in its identification of objects that the system is configured to identify in the specific embodiment, such as humans (which in this instance may include both human players on the football field and spectators in the crowd). In some embodiments, the amount of movement and/or size of detected objects between frames may be used in part to determine which objects are part of the foreground (such as being part of the action within the shot) and which are background or negative space (such as a spectator sitting within an audience or crowd). The detected candidate crowd regions 106a-106d in frame 102 may have been determined based on methods that will be described below with reference to the flow charts of FIGS. 2A and 2B.

Figure 1C:
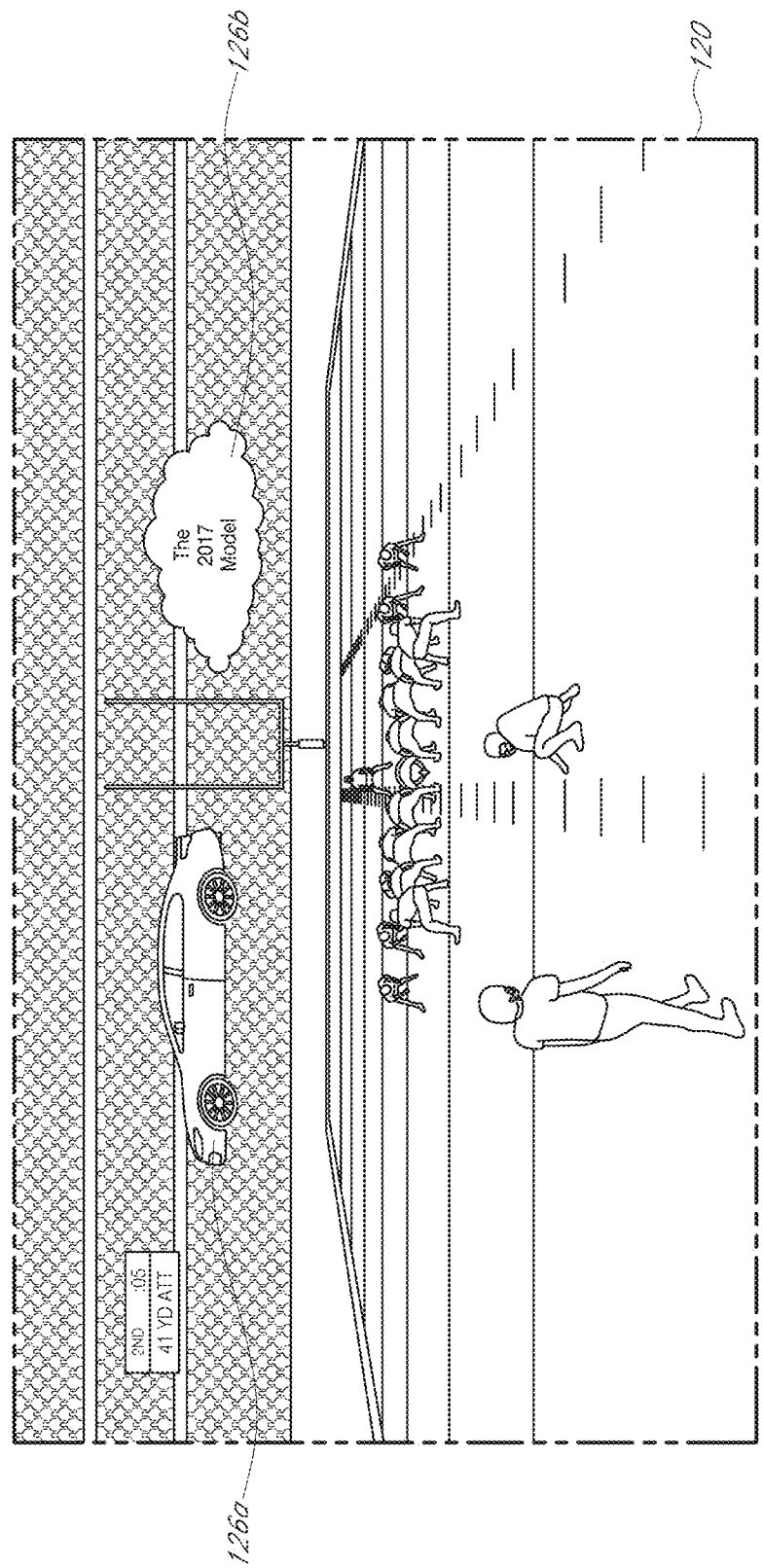
FIG. 1C is a sample frame of augmented video in which event video has been augmented to include advertisement video content within detected negative space of the video.

FIG. 1C is a sample video frame 120 in which event video has been augmented to include advertisement video content within detected negative space of the video. As illustrated, the computing system has added a partially transparent overlay of advertisement content (in this case, including a car graphic and associated text) covering two portions of the crowd and other background content at 126a and 126b. The augmented content 126a and 126b may animate or change over a number of consecutive frames of the video, with their in-frame position tracking the same real-world areas of the crowd. For example, as the camera that records the football game pans, tilts, zooms or otherwise adjusts its view of the real world scene from frame to frame, the animated overlay areas 126a and 126b may appear to be superimposed within consistent positions of the real-world scene, and optionally with a 3D pose matching a real-world object, collection of real world objects, or a real world area within the scene. It may thus appear to a viewer of the augmented video that the superimposed animated content 126a and 126b is within a plane or three-dimensional area that maintains a consistent three-dimensional position (and optionally pose) relative to the field, goalposts, crowd, etc.

Figure 2A:
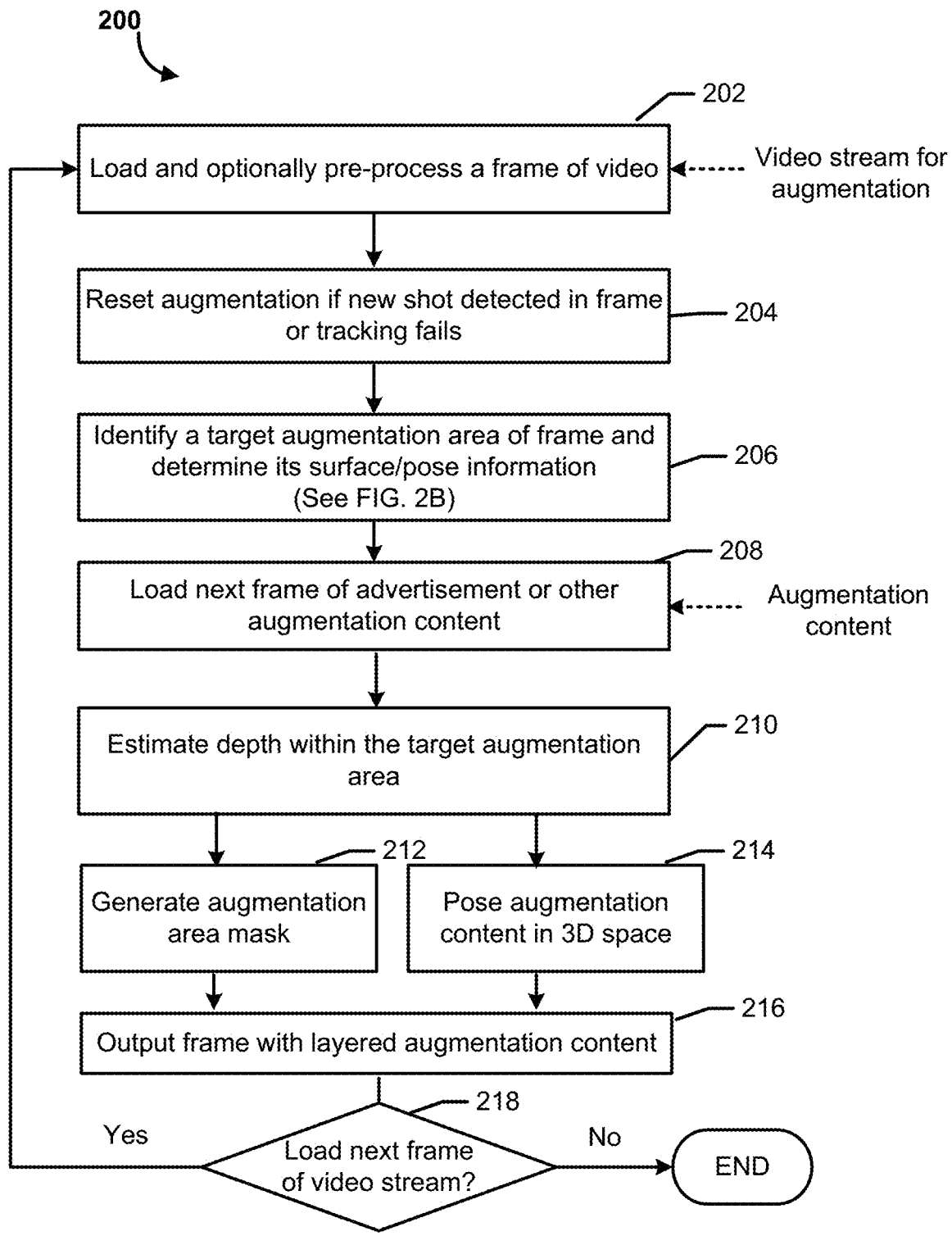
FIG. 2A is a flow diagram of an illustrative method for augmenting video data to include advertisement content or other augmentation content within one or more detected regions of individual frames.

FIG. 2A is a flow diagram of an illustrative method 200 for augmenting video data to include advertisement content or other augmentation content within one or more detected regions of individual frames. While the method 200 is described with reference to a process that is repeated for each of a number of individual frames of a video, it will be appreciated that a similar process could be implemented for a still image as opposed to a video. The illustrative method 200 may be performed by a computing system such as computing system 302, which will be described below with reference to FIG. 3. The illustrative method 200 begins at block 202, where the computing system loads a frame of video, such as a first frame of streaming video from a broadcast or network source (such as via the Internet or an over-the-air signal), or from a local electronic data store. In some embodiments, the video may be analyzed for augmentation in real time as a camera records the video at a live event, such as a professional sporting event.

In some such embodiments, the computing system may receive a live streaming video feed on a short delay before it airs on "live" television or other broadcast stream (such as a 2-10 second delay) in order for advertisement content to be augmented within the video. In other embodiments, the video data to be augmented may have been recorded previously and retrieved by the computing system from a data store, such as at the request of a content owner or user who has selected the video for augmentation by the computing system. The system may optionally apply preprocessing to the video in order to be in a format expected by the machine learning models and other techniques described below. For example, the color space or color model may be modified, the resolution modified, sample frames selected, and/or other pre-processing.

Next, at block 204, the computing system may determine whether the current frame is a new camera shot relative to the prior frame (if any) that the computing system analyzed within the video stream, or may otherwise determine that tracking has failed relative to the prior frame. For example, as will be described below, the illustrative method may loop through the blocks of FIG. 2A for the various frames of the video, and block 204 may be implemented in order to determine when there has a been a cut to a new camera shot within the video stream. If a new shot is detected in the current frame, the computing system may reset any previous augmentation that had been applied in prior frames, stop object tracking between the previous frame and current frame, and/or otherwise reset various tracked parameters, virtual camera settings, and/or displayed augmentation from prior frames due to the potential for an abrupt change in camera position and pose that may occur between successive frames as a result of a shot change. Tracking an area or object across successive frames may be performed by the computing system using any of a number of known tracking methods, such as SIFT, SURF or KAZE. In some embodiments, panning, zooming or other gradual changes in a shot may not be considered a shot change and may not result in resetting augmentation or tracking data. While the computing system may be configured to determine that a shot change has occurred in some embodiments, in other embodiments the computing system may instead continue tracking one or more objects from one or more prior frames until the tracking fails, which may or may not correspond to an actual shot change (e.g., the tracked object may have abruptly moved, been obscured or may have dropped from the frame).

Determining whether the current frame represents a new shot relative to the previous frame may include applying image differencing techniques, such as determining the difference in corresponding pixel values between the two frames, and/or extracting features and identifying differences in the extracted features between the two frames. A threshold may be retrieved by the computing system and compared to the difference value determined between the two frames to determine whether there was a sufficient difference to consider the current frame to be a new shot for purposes of resetting the augmentation (e.g., the current frame may be considered a new shot if the determined difference is greater than a threshold value). One or more of various techniques known in the art of image processing and/or computer vision may be used to determine differences between successive frames, such as histogram differencing, frame-wise keypoint matching and/or the Sum of Absolute Differences (SAD).

At block 206, the computing system identifies one or more target augmentation areas of the frame, and determines each such area's surface and pose information to be used in compositing or augmenting the frame. As discussed above, the target area(s), in some embodiments, may be areas that are part of the background, considered negative space, depict one or more target objects, do not move or change substantially between shots, and/or are not part of the action of the shot, depending on the embodiment. Identifying target augmentation areas and their corresponding pose information will be described in detail below with respect to FIG. 2B.

If an augmentation area is identified at block 206 (e.g., the computing system determines that one or more portions of the frame should be augmented with an advertisement or other content overlay), the computing system retrieves a first frame (or next frame, if the previous frame was also augmented) of the augmentation content to overlay or superimpose within the target area(s) of the frame. The augmentation content may have been previously selected by a user, selected based on an advertising bidding system or other known technique for matching advertisement or sponsors with advertising opportunities, selected programmatically based on content or objects identified in the video stream, and/or in another manner. In some embodiments, the augmentation content may be a previously stored video or image. In other embodiments, the computing system may dynamically generate all or a portion of the augmentation content, such as rendering visual text for display, assembling the augmentation content using smaller component images or text, drawing shapes, or applying visual effects (such as highlighting, color or contrast variations, etc.) to portions of the video frame. For example, the computing system may receive real time statistical information associated with a sporting event captured in the video as text or numbers, and may render the information as augmentation content in a visually appealing way (e.g., using fonts, animated visual effects that change from frame to frame of the augmentation, etc.).

Next, at block 210, the computing system may determine depth of individual pixels or objects within the target area or region. In some embodiments, this may include setting up a virtual camera, applying a convolutional neural network or other machine learning model, or using simultaneous localization and mapping (SLAM) techniques. In one embodiment in which a virtual camera is employed, the computing system may set up the virtual camera for real time compositing based on camera-solving information (e.g., an estimated pose and position of the real camera that captured the video) and pose information associated with the augmentation area, as determined at block 206 above (which will be described in more detail below with respect to FIG. 2B). In one embodiment, the computing system may determine a surface extrema and/or three-dimensional pose of a centroid of a detected object or area for use in arranging a three-dimensional virtual environment (which may include at least a virtual camera and an object or surface) for rendering the augmentation content. In one example, a virtual camera may be generated or placed within a virtual environment using position, rotation and field of view data determined by the computing system, such as that described in more detail below with respect to FIG. 2B.

At block 212, the computing system may generate a mask corresponding to the augmentation area (e.g., the portion of the original video frame in which augmentation content should be superimposed). In one embodiment, the mask data may be based on segmentation data previously determined by the computing system, where the segmentation data identifies the pixels of the current frame that represent the negative space (such as a crowd) or other augmentation area of interest. The resulting mask may be, for example, black and white image data having the dimensions of the original frame, where the pixel value at a given location represents whether augmentation content should or should not be overlaid at the given pixel location.

At block 214 (which may be implemented before, after or in parallel with block 212), the computing system may pose the augmentation content within three-dimensional space, such as within the virtual scene or environment discussed above. The rotation, position, sizing and/or other data associated with the placement and pose of the augmentation content may change from frame to frame based on the analysis of the target area's position and pose and well as the estimated camera location that captured the video (as discussed above and will be further discussed below). For example, the data used to render the augmentation content in three-dimensional space may be based on a data file (described below with reference to FIG. 2B) that is generated by the computing system and identifies determined position, pose and/or surface data of a candidate or target augmentation region, object or planar surface.

Next, at block 216, the computing system may apply the mask to the rendered augmentation content (rendered in 3D space at an in-frame location corresponding to the target area), such that the augmentation content only appears at pixel locations corresponding to the candidate region (such as background or negative space) rather than at the location of foreground content, in-game action, or other critical areas of the video from the perspective of a rights holder or viewer, depending on the embodiment. In some embodiments, the content may be overlaid, composited, blended or superimposed with partial transparency relative to the original content of the video frame, such that the original video content is visible beneath the augmented overlay. In other embodiments, the overlay pixel values may completely replace the corresponding pixel values in the original video frame at the augmented pixel locations.

Once the composite frame is generated to include the overlay or augmentation content, the composite frame may be output to a file, such as a video file that is gradually generated frame by frame through successive passes of the method 200. In other embodiments, the resulting composite frame may be broadcast or streamed as part of a live streaming Internet presentation, a television network's broadcast, and/or other live or slightly delayed presentation of an event. Though not illustrated in FIG. 2A, the computing system may store some data determined above (such as object position information, rotation information, shot signatures or other data) related to the current frame in RAM or other memory in order to be used by the computing system in analyzing subsequent frames (such as to track object positions between frames or determine whether there is a shot change).

At block 218, the computing system may then determine whether there are additional frames of the video stream or other underlying video content to analyze for potential augmentation. In some embodiments, such as when the method 200 is triggered in order to augment the video content with a single advertisement, the next frame of the underlying video of the event may be loaded at block 218 as long as there is additional content of the advertisement to display. For example, an additional frame of the event video may be loaded for potential augmentation if the advertisement is a video of a certain length that has not yet been presented in full, or if the advertisement should otherwise be displayed for a certain amount of time (such as a certain number of seconds requested by the advertiser) that has not yet passed. In some embodiments, the new frame may be the next frame of the video. In other embodiments, the new frame to analyze for augmentation may be selected based on a sampling rate (e.g., may be a certain preset number of frames after the current frame), such as if the current advertisement content has ended or if the current frame was determined to not be appropriate for augmentation. If a new frame is loaded for potential augmentation at block 218, the method loops back to block 202 for pre-processing and analysis of the new frame. In some embodiments, tracking of the region of interest or objects therein may be employed between frames (as discussed elsewhere herein), such that certain blocks of FIG. 2A, such as block 206, do not need to be repeated in full for successive frames while tracking remains successful. If no new frame is loaded for analysis, the illustrative method ends.

While FIG. 2A has been presented and described with reference to a continuous augmentation of content over a number of frames, it will be appreciated that there may be frames that are analyzed by the computing system for augmentation, but that do not result in augmentation. For example, certain frames, such as after a shot change, may be determined by the computing system to not have a sufficient augmentation area or to otherwise by inappropriate for augmentation in a given instance.

Figure 2B:
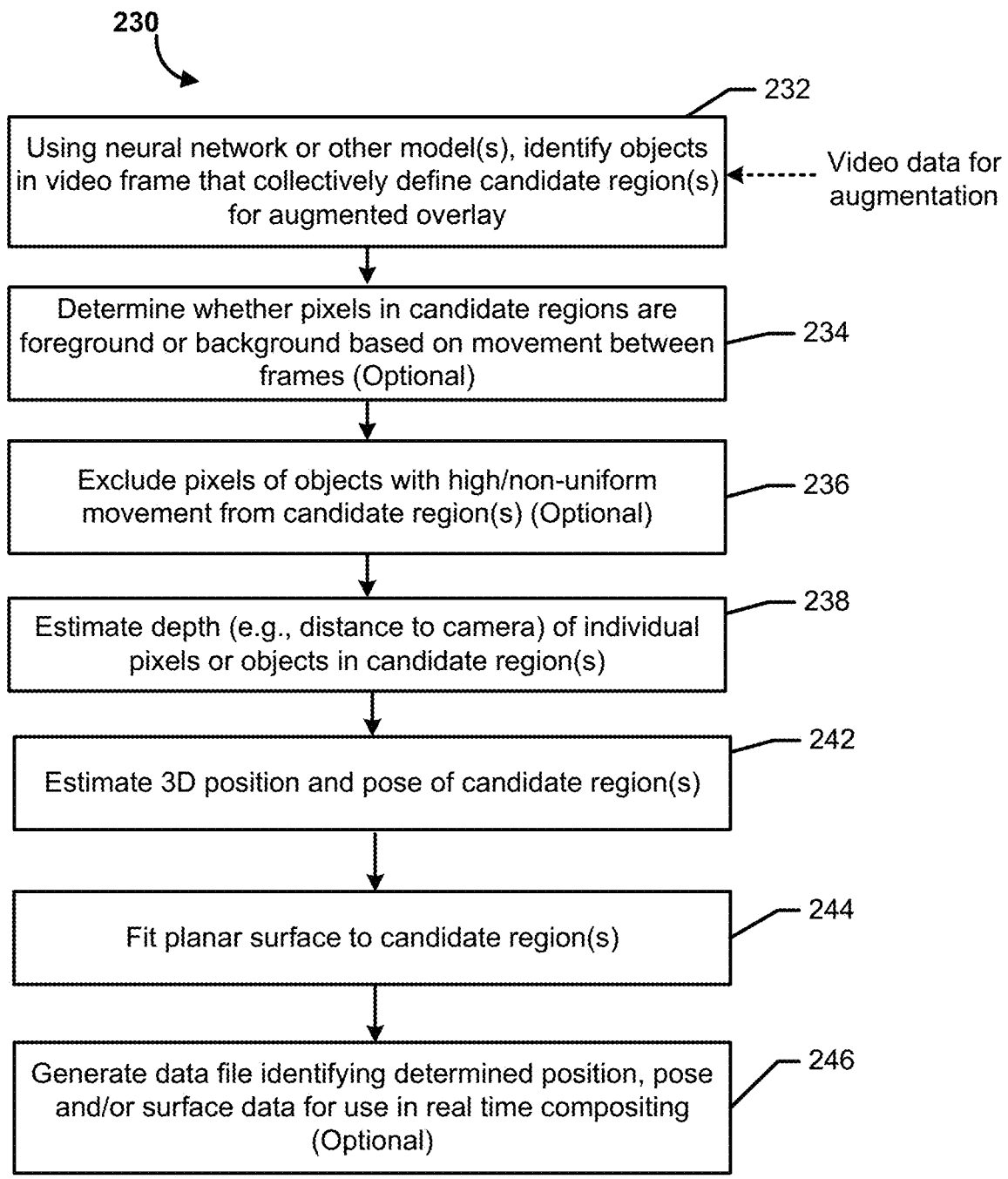
FIG. 2B is a flow diagram of an illustrative method for identifying one or more target augmentation areas of a video frame, as well as determining each target area's surface and pose information.

FIG. 2B is a flow diagram of an illustrative method 230 for identifying one or more target augmentation areas of a video frame or image, as well as determining each target area's surface and pose information. In some embodiments, the method 230 may be implemented by the computing system at block 206 of method 200 described above with reference to FIG. 2A. In other embodiments, block 206 described above may be performed in other manners, and is not limited to the specific method illustrated in FIG. 2B. The method 230 begins at block 232, where the computing system may use a convolutional neural network (CNN) or other machine learning model to identify one or more candidate regions, areas or objects within the image or the current frame of the video for potential augmented overlay. For example, in an embodiment in which the computing system is configured to superimpose an advertisement or other augmentation content over a crowd identified in an arena or stadium depicted in the video, a CNN or other model may have been trained to identify clusters of people. Accordingly, in some embodiments, identifying a given candidate region may include identifying a number of similar objects (such as individual people) that appear in a cluster or pattern in the frame, while in other embodiments a candidate region may be based on a single identified object (such as a portion of the venue, a table, sporting equipment such as a basketball stanchion, etc.). In some embodiments, the candidate region may be identified based on a segmentation process (such as using a CNN or other model) that identifies one or more textures of interest (such as a crowd of people, grass, sky, etc.) in an image or video frame.

In some embodiments, the computing system may be configured to identify candidate regions having certain dimensions or ranges of dimensions. For example, if an advertisement image or video to be superimposed in the event video has a certain width and height as stored in a data store, one or more machine learning models may be configured to identify one or more rectangular candidate regions having a width to height ratio that matches or approximates the width to height ratio of the stored advertisement. While this example relates to a rectangular candidate region, it will be appreciated that the techniques described herein are not limited to any particular shape of candidate region. Accordingly, identified candidate regions may exclude some of the crowd, negative space or similar content in the original video (e.g., sections of the crowd that are too small or sparse to fit a properly sized advertisement) and/or may include portions that do not match the negative space, crowd or other criteria in isolation (e.g., a crowd section may be identifying based on a machine learning model identifying one or more clusters of people in a relatively large region of the video frame, and that large region may be designated as a candidate region even if subsets or portions of the region do not include people, such as an aisle or empty seats).

In some embodiments, criteria may be applied by the computing system regarding a spatial and/or size relationship that should be met between a pair or other set of related candidate regions. For example, in the sample augmented frame shown in FIG. 1C discussed above, the system may have been configured to identify two equally sized regions within a threshold distance of each other and with similar pose as each other in order to augment advertisement content that is intended to be presented in two paired regions. As another example, in FIG. 5F, discussed below, eight similarly sized candidate regions may be selected to display overlaid content, even though those regions may not be equally sized or have the same pose as each other.

The one or more machine learning models used by the computing system at block 232 may have been previously trained in a number of ways, depending on the embodiment. For example, an operator associated with an augmentation service provided by the computing system may have provided training images or videos of the type of region to detect (e.g., crowds at sporting events, the sky, in-venue signage, a field, an ice rink, a boxing ring, in-venue sporting equipment, a road or track, people, vehicles, and/or other object or set of objects of interest in a given embodiment or instance). In some embodiments, the operator may have marked (such as with bounding boxes, image coordinates or in another manner) what should be considered a region of interest in specific sample frames or images of the training data. In other embodiments, the computing system may have determined candidate regions in training video without any explicit marking of the negative space or other candidate regions by a human. For example, the computing system may have identified areas that meet certain criteria (such as remaining relatively static over a set of frames compared to movement in other portions of those frames, not being the focus of the camera, etc.).

As discussed above, in some embodiments, example candidate regions identified by the computing system may have been presented in a user interface to a user associated with an advertiser, broadcaster, venue owner, team, and/or other rights holder for their approval or confirmation that a certain type of region should be considered negative space, augmentation-appropriate and/or otherwise considered for augmentation when the system identifies similar regions in image or video content. Accordingly, the machine learning models used at block 232 may be specific to a given rights holder (e.g., a certain broadcaster, league or team), specific to a given advertiser (e.g., an advertiser may have indicated to the system that the advertiser's ads should only appear on clouds), specific to a given venue (e.g., trained using video recorded at a certain venue and used only for video recorded at that venue), specific to a given sport (across multiple venues and/or leagues), specific to a given content creator associated with the video (e.g., used for a specific content creator who uploads his user-created videos to a video sharing platform or social networking service), and/or tailored in some other manner.

Once one or more candidate regions have been identified, the method 230 proceeds to optional block 234, where the computing system may determine whether individual pixels in the candidate region(s) are part of an object that is in the foreground or background, and/or whether the depicted object or other real world content is moving substantially between frames. The purpose of such determinations may be to determine whether some pixels or portions of a given candidate region are not appropriate for an overlay or augmentation, even if the region as a whole may generally represent negative space or otherwise be appropriate for augmentation. For example, a region may generally include various spectators who are seated in the stands of an arena and who remain in a relatively consistent position over a 15 second or other period (which may be ad-appropriate or eligible for augmentation in a given embodiment), but may also include an aisle or walkway in which spectators are moving relatively rapidly (which may be inappropriate for augmentation in the given embodiment). In some embodiments, whether a candidate region is appropriate for an overlay or augmentation may be alternatively or additionally based on a score determined for the candidate region. The score may, for example, represent the extent to which the region is connected, contains no holes, and is compact.

In some embodiments, the computing system may apply one or more optical flow techniques known in the field of computer vision in order to characterize and/or quantify the motion of objects, and may apply movement thresholds regarding which objects or pixels are appropriate to be covered or partially covered by an overlay (and which objects or pixels should conversely be excluded from augmentation). At block 236, the pixels corresponding to objects that are moving (e.g., moving beyond a threshold amount) and/or in the foreground may be excluded from the pixels or region marked for augmentation. In some embodiments, the excluded pixel information may be used in generating an augmentation area mask, as described above with respect to block 212 of FIG. 2A.

At block 238, the computing system may estimate depth (e.g., the distance from the real world camera capturing a video to a real world object depicted in the video) of individual pixels or objects in each of the one or more candidate regions. In some embodiments, the depth estimation may be performed by a machine learning model, such as a CNN, if only a single camera captured the video (e.g., there is not sufficient recorded data to calculate a more precise depth). This may differ from systems in which two cameras are used, as such systems may use stereoscopic techniques to estimate depth more directly based on comparisons of video frames captured by the different cameras from different positions. In some embodiments, the machine learning model may be trained to estimate distance based at least in part on the lighting at individual pixel locations. The model may have been previously trained using sample video with corresponding actual depth information (which may have been recorded using range finders or other sensors to determine depth, such as a combination camera and infrared laser emitter like the KINECT sensor by MICROSOFT®). The result of the CNN or other model used at block 238 may be a value for each pixel representing an estimated distance to the camera. While the system may perform monocular depth estimation (using supervised or unsupervised machine learning techniques) in embodiments in which a single traditional camera with no other depth-related hardware is used in recording the video at the event, other embodiments may employ stereoscopic or other approaches using multiple cameras or depth sensors.

Next, the computing system may optionally estimate a three-dimensional (3D) position and pose of the real world camera at the time that the camera captured the given frame. The computing system may employ one or more of various camera solving techniques known in the field of computer vision. The result may be a "six degrees of freedom" (6DoF) estimation that includes 3D estimated (x, y, z) coordinates and a 3D rotation of the camera.

At block 242, the computing system may then estimate a 3D position and pose of each of the one or more candidate regions, which may be estimated based in part on a homography model. For example, the computing system may determine the 6DoF (e.g., a 3D position and pose) of the candidate region or an object (e.g., a crowd) depicted therein. The 3D position (x, y, and z coordinates) determined may be for the centroid of a given region or blob (e.g., the crowd, negative space, or other content to be augmented). The 6DoF information may be determined, for example, based on the various depths determined above at different pixel locations within the region.

At block 244, the computing system may fit a planar surface to each candidate region. In other embodiments, the computing system may fit a nonplanar surface, depending on the embodiment, type of content in the image or video, and desired appearance of the augmentation content. In some embodiments, the planar surface may be a predetermined target size, while in other embodiments, the planar surface may be the largest planar surface that the computing system can fit to the given region. The surface fitting may be implemented using known techniques of least-square plane fitting, semantic modeling, primitive completion, and/or other approaches. Though the computing system may fit a planar surface to a candidate region, it will be appreciated that the real world objects depicted in that region may vary in depth and not perfectly match the planar surface determined by the computing system. For example, while some prior art augmentation systems may identify actual planar surfaces depicted in a video (such as a wall, floor, or billboard), aspects of the present disclosure may be applied to augment portions of an image or video that do not actually depict a planar surface.

At block 246, the computing system may store (such as in RAM or in an electronic database) the various position, pose and/or surface data determined above. In some embodiments, a JavaScript Object Notation (JSON) or other data file may be generated that may then be used during method 200 described above when augmenting the given video frame or image. For example, the computing system may use this data when augmenting the frame with an advertisement or other augmentation content in order for the augmentation content to have a position and pose that matches the position and pose of the surface fit to one or more candidate regions above. The illustrative method 230 then ends.

Figure 3:
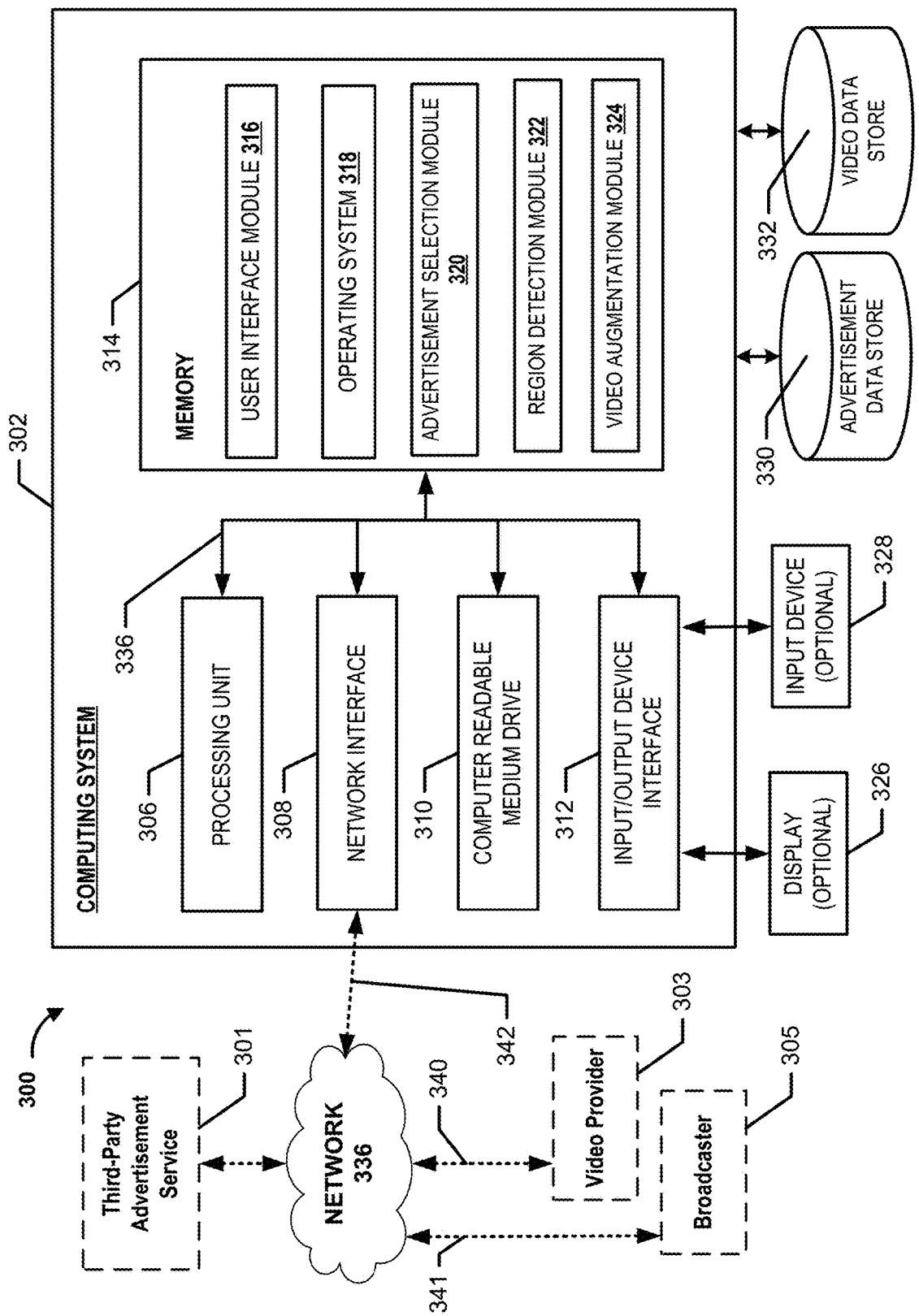
FIG. 3 is a system block diagram of a computing environment suitable for use in various embodiments of the present disclosure.

FIG. 3 is a system block diagram of a computing environment 300 suitable for use in various embodiments of the present disclosure. As depicted in FIG. 3, the computing environment 300 may include a computing system 302. The general architecture of the computing system 302 may include an arrangement of computer hardware and software components used to implement aspects of the present disclosure. The computing system 302 may include many more (or fewer) elements than those shown in FIG. 3. It is not necessary, however, that all of these generally conventional elements be shown in order to provide an enabling disclosure.

As illustrated, the computing system 302 includes a processing unit 306, a network interface 308, a computer readable medium drive 310, an input/output device interface 312, an optional display 326, and an optional input device 328, all of which may communicate with one another by way of a communication bus 336. The processing unit 306 may communicate to and from memory 314 and may provide output information for the optional display 326 via the input/output device interface 312. The input/output device interface 312 may also accept input from the optional input device 328, such as a keyboard, mouse, digital pen, microphone, touch screen, gesture recognition system, voice recognition system, or other input device known in the art.

The memory 314 may contain computer program instructions (grouped as modules or components in some embodiments) that the processing unit 306 may execute in order to implement one or more embodiments described herein. The memory 314 may generally include RAM, ROM and/or other persistent, auxiliary or non-transitory computer-readable media. The memory 314 may store an operating system 318 that provides computer program instructions for use by the processing unit 306 in the general administration and operation of the computing system 302. The memory 314 may further include computer program instructions and other information for implementing aspects of the present disclosure. For example, in one embodiment, the memory 314 may include a user interface module 316 that generates user interfaces (and/or instructions therefor) for display by a computing system (such as by computing system 302 or another computing device that receives a user interface or other content generated by the computing system 302 for display).

In some embodiments, the memory 314 may include an advertisement selection module 320, which may be executed by the processing unit 306 to select advertisement content for display. For example, advertisement video or image content may be selected based on objects or other content detected in the underlying video (e.g., depending on the sport, teams, stadium and/or other information determined from an automated analysis of the video data). The sport, teams, venue and/or related data may be detected in video data using systems and methods described in co-owned and co-pending U.S. patent application Ser. No. 15/709,168, filed Sep. 19, 2017, entitled "MACHINE LEARNING MODELS FOR IDENTIFYING SPORTS TEAMS DEPICTED IN IMAGE OR VIDEO DATA," which is hereby incorporated by referenced in its entirety herein. In some embodiments, the advertisement selection module 320 may employ bidding techniques to match advertisements or other sponsored content to be augmented within portions of event video based on various factors, such as using real time bidding systems and methods described in co-owned and co-pending U.S. patent application Ser. No. 15/709,225, filed Sep. 19, 2017, entitled "AUTOMATED CONTROL OF DISPLAY DEVICES," which is hereby incorporated by referenced in its entirety herein.

The memory 314 may further include a region detection module 322, which may be executed by the processing unit 306 to perform certain operations related to identifying and analyzing negative space regions or other target regions for advertisements or other augmentation according to various embodiments described herein (such as the operations described with reference to FIG. 2B above). The memory 314 may also include a video augmentation module 324, which may be executed by the processing unit 306 to perform other operations associated with augmenting video data according to various embodiments described herein (such as the operations described with reference to FIG. 2A above). The modules 320, 322 and/or 324 may access the data stores 330 and/or 332 in order to retrieve data described above and/or store data.

The video data store 332 may store digital video data, such as that recorded to a DVR or accessed from an Internet-accessible video source, of various event broadcasts and/or other video files. Alternatively, the video data in video data store 332 may have been received from a streaming source in real time or near-real time as the content is analyzed and augmented (e.g., the video data may be only temporarily stored, cached or buffered in video data store 332). The advertisement data store 330 may include advertisement content in the form of images or videos (or text data or other non-image data to be interpreted by the computing system 302 for presentation in visual form), as well as information identifying the associated sponsor, bid, keywords, and/or other information associated with the advertisement content. In embodiments in which the computing system 302 is configured to augment video data with augmentation content other than advertisement content, the advertisement data store 330 may additionally or alternatively store such content.

Each of the data stores may be part of the computing system 302, remote from the computing system 302, and/or may be a network-based service. Additionally, in some embodiments, one or more data stores accessible to the computing system 302 may store trained models and data used for the classification of video frames or images to identify objects or regions appearing within the images or video frames (not illustrated in FIG. 3).

In some embodiments, the network interface 308 may provide connectivity to one or more networks or computing systems, and the processing unit 306 may receive information and instructions from other computing systems or services via one or more networks. In the example illustrated in FIG. 3, the network interface 308 may be in communication with an optional third-party advertisement service 301, optional video provider 303 and optional broadcaster 305 via the network 336, such as the Internet. In particular, the computing system 302 may establish a communication link 342 with a network 336 (e.g., using known protocols) in order to send communications to the computing system 303 over the network 336. Similarly, the third-party advertisement service 301, video provider 303 and broadcaster 305 may send and receive communications to and from the computing system 302 over the network 336 via wired or wireless communication links (such as links 340 and 341). The third-party advertisement service 301 may provide advertisement content for the computing system 302 to add to a given video as discussed herein. In some embodiments, the video provider 303 may be a television broadcaster, a cable or satellite-based television service, an online video sharing platform, and/or other video source for the video data to be augmented by the computing system 302. The broadcaster 305 may be the recipient of augmented video data generated by the computing system 302 for distribution to downstream viewers, and may include one or more similar services or entities as the video provider service 303.

Those skilled in the art will recognize that the computing systems 301, 302, 303 and 305 may each be any of a number of computing systems including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and/or the like.

Figure 4A:
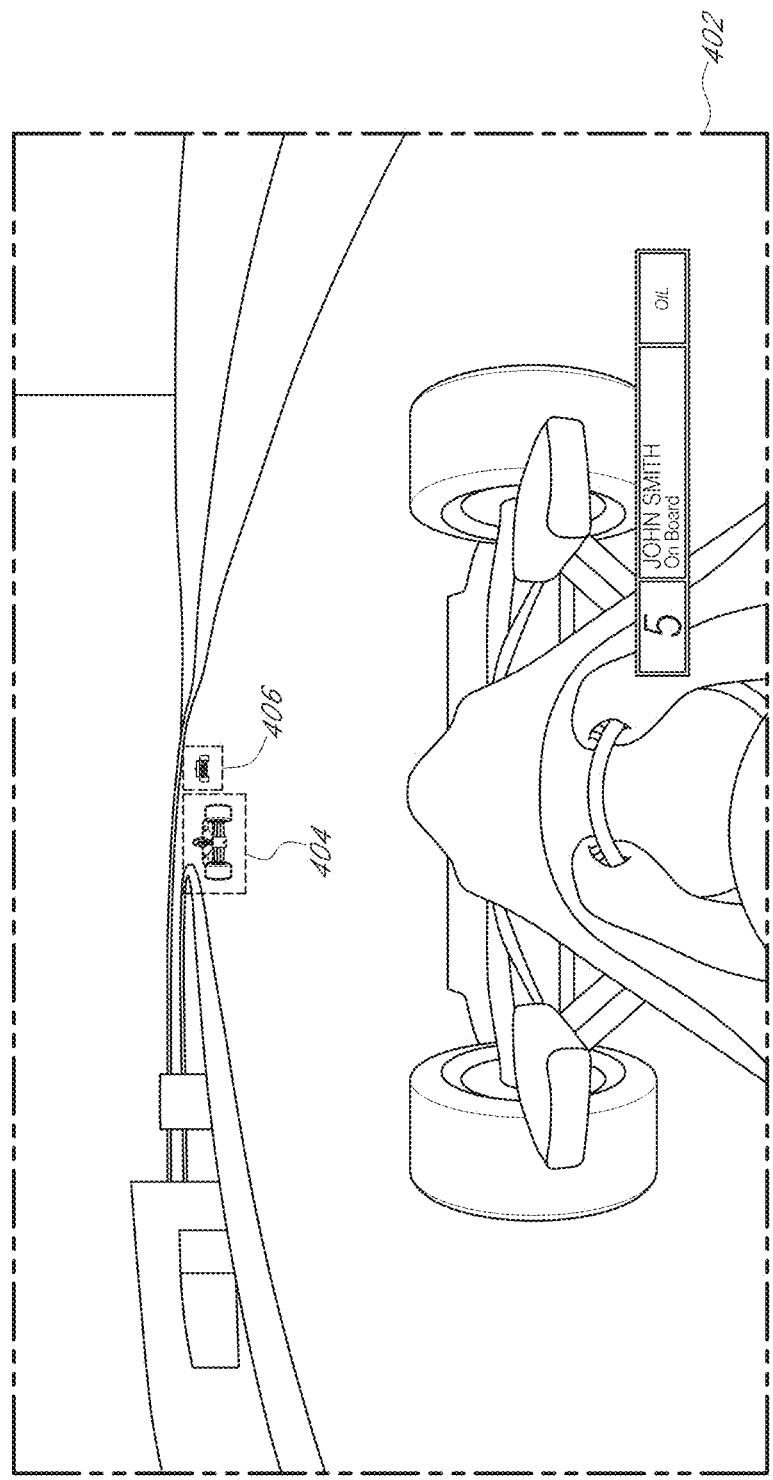
FIG. 4A depicts a frame of event video that includes bounding boxes identifying detected locations of race cars.
Figure 4B:
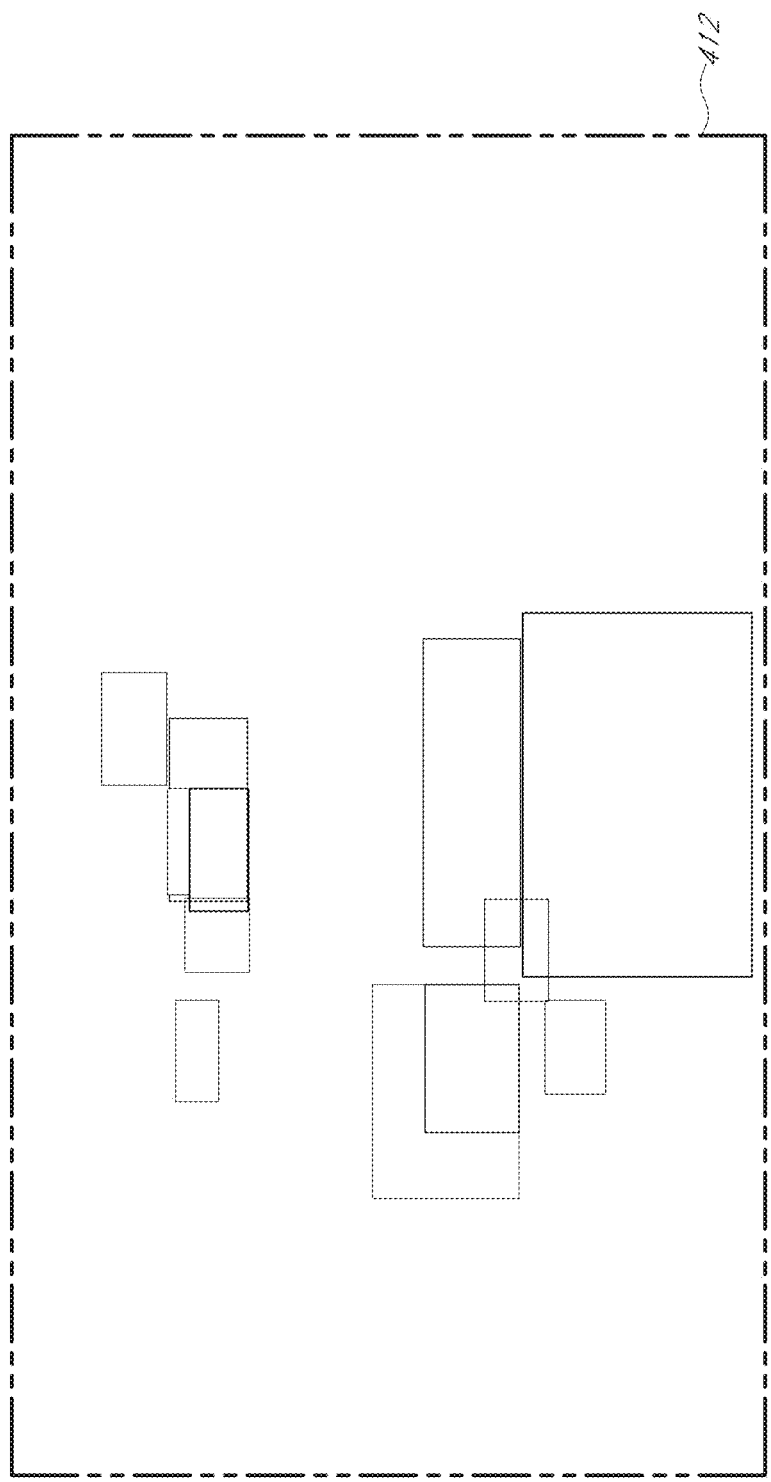
FIG. 4B depicts a graphical representation of heat map data corresponding to FIG. 4A.
Figure 4C:
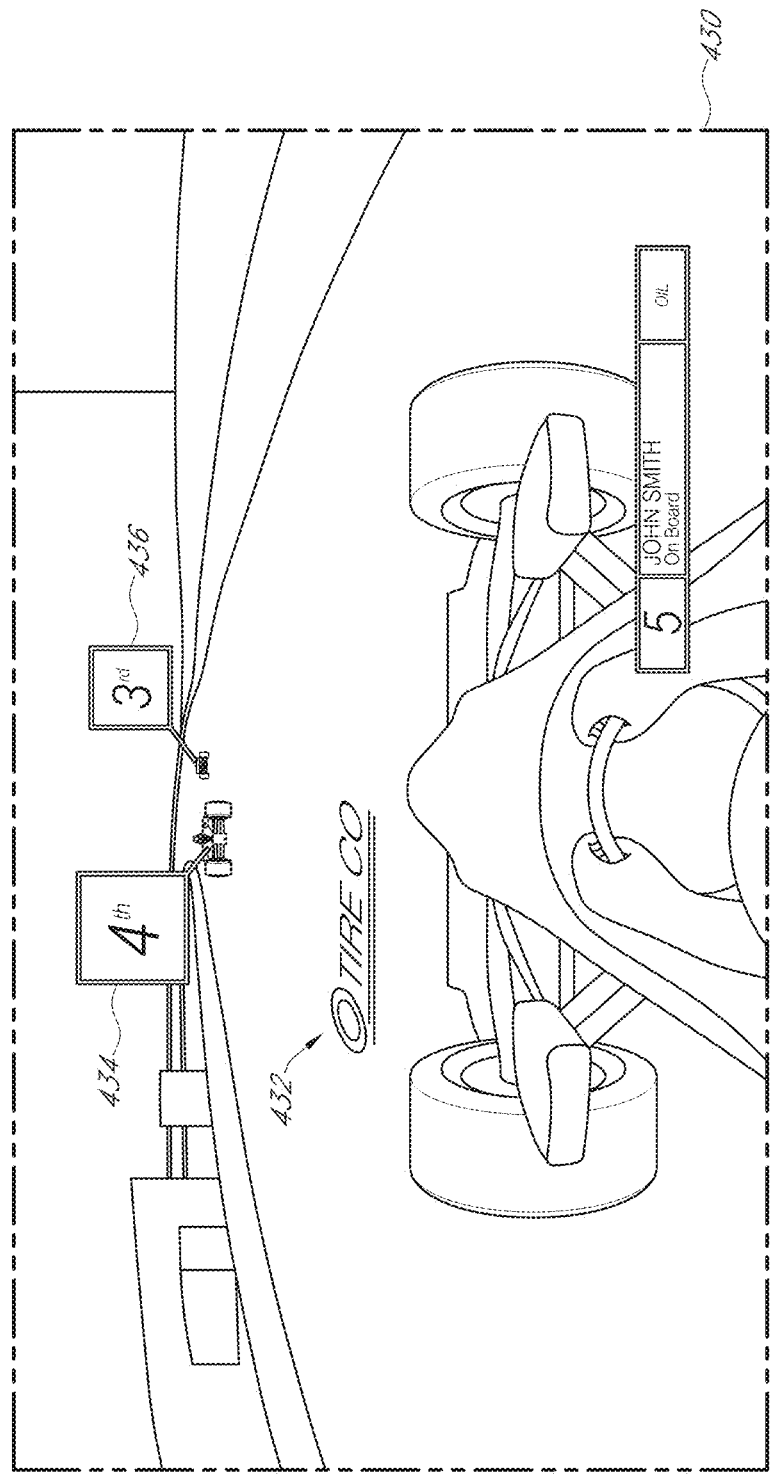
FIG. 4C is a sample frame of augmented video that includes a company logo superimposed on a race track, as well as augmented graphical information associated with detected race cars.

FIG. 4A depicts a frame of event video 402 that includes bounding boxes 404 and 406 identifying detected locations of race cars, while FIG. 4B graphically represents corresponding heat map data 412 determined by the computing system. While examples are provided herein of heat map representations, in other embodiments the computing system may apply segmentation techniques that output a mask rather than heat map data. FIG. 4C is a sample frame 430 of augmented video (which may be the same frame as 402 after augmentation) that includes a company logo or advertisement 432 superimposed on a race track, as well as augmented graphical information 434 and 436 associated with detected race cars 404 and 406. The augmented content 434 and 436 may move from frame to frame to track movement of the associated real world objects (race cars) depicted in the video. The logo 432 may appear, as one example, to be fixed in a certain position relative to one of the vehicles or a given lane of the track as the camera and cars move from frame to frame. For example, as a helmet or dashboard camera captures the scene as the driver turns to his left, the logo may shift to the right in the frame so that it appears within each frame to remain at a certain positional offset from the lane marker.

Figure 5B:
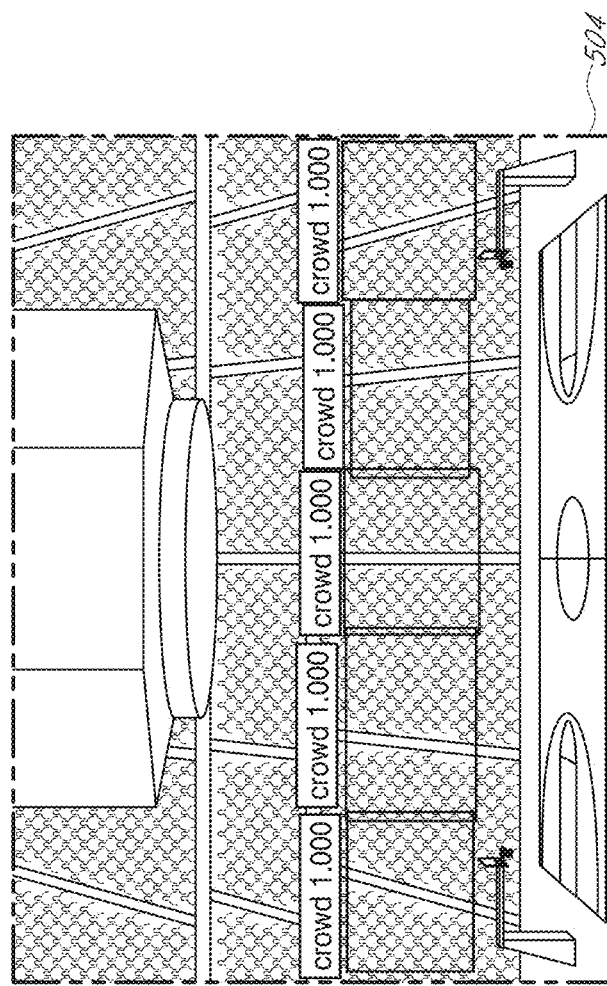
FIG. 5B depicts detected crowd regions in the frame of FIG. 5A.
Figure 5C:
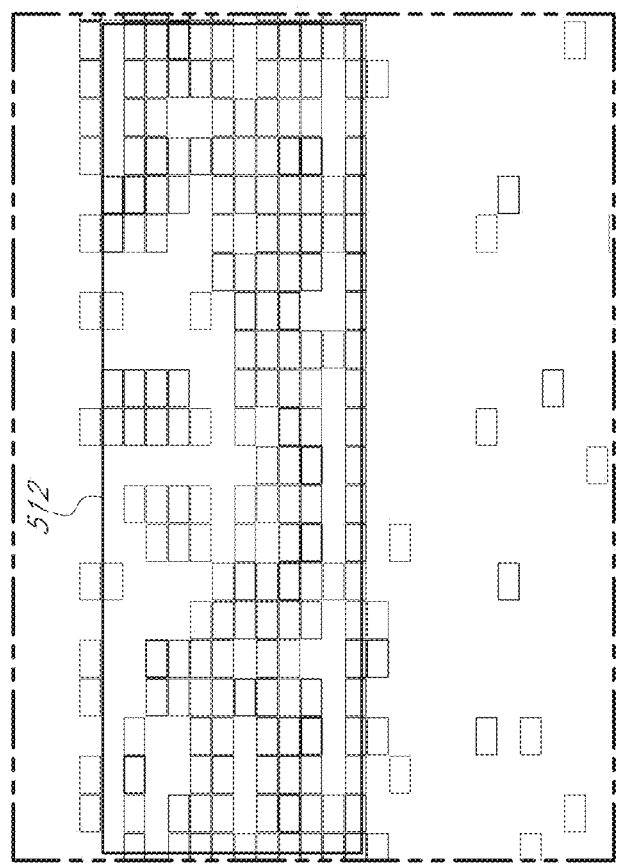
FIG. 5C depicts bounding boxes and heat map data for detected advertisement-safe regions in the frame of FIG. 5A.

FIG. 5A depicts a sample frame 502 of television broadcast video from a basketball game. FIG. 5B depicts detected crowd regions (appearing with the label "crowd 1.000") in the frame of FIG. 5A. FIG. 5B may be considered a graphical depiction of the output of an intermediary step performed by the computing system of determining candidate crowd regions that exceed a certain threshold confidence determined by the computing system. FIG. 5C is another graphical depiction of an intermediary step, which depicts bounding box 512 relative to heat map data for one or more detected advertisement-safe regions (in this case, detected crowds) in the frame of FIG. 5A.

Figure 5D:
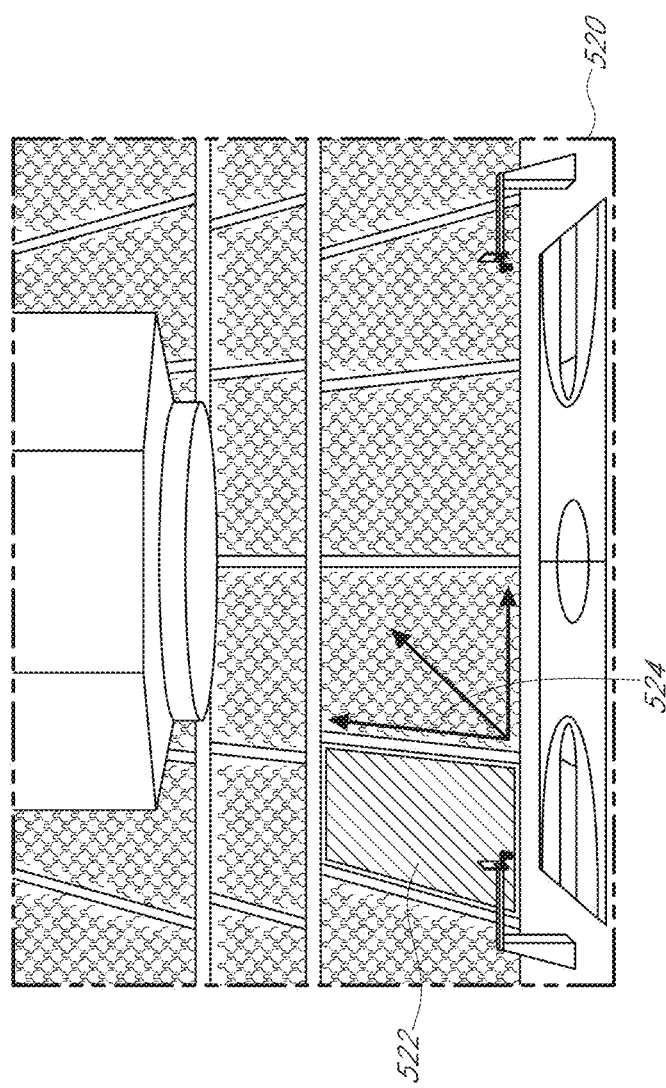
FIG. 5D depicts determined three-dimensional tracking and pose data for an advertisement-safe region detected in the frame of FIG. 5A.
Figure 5E:
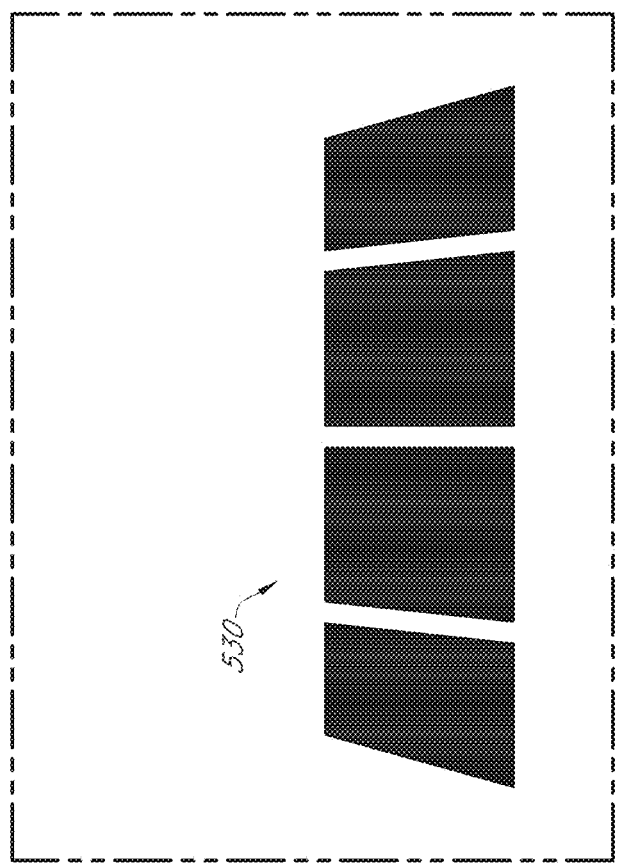
FIG. 5E depicts mask data associated with detected crowd regions in the frame of FIG. 5A for use in augmenting the frame of video data.
Figure 5F:
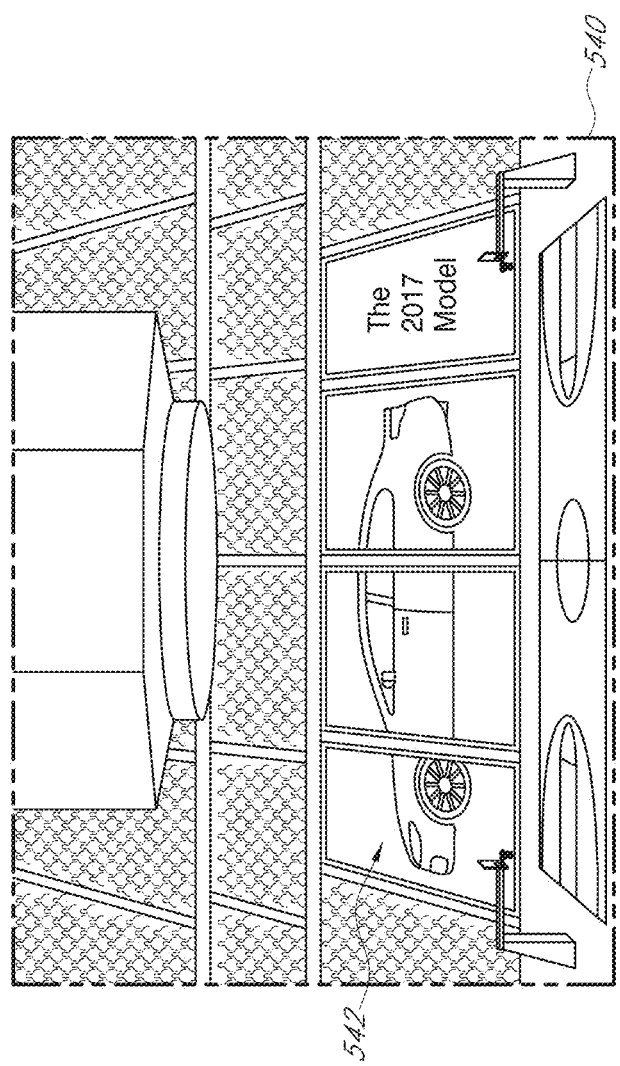
FIG. 5F depicts an augmented version of the frame of FIG. 5A that includes advertisement data within detected crowd regions.

FIG. 5D depicts a marked frame 520 including graphical representations of determined three-dimensional tracking and pose data 524 for an advertisement-safe region (depicted as a planar surface 522, which is not actually a part of the real world scene) detected in the frame of FIG. 5A. FIG. 5E depicts mask data 530 associated with detected crowd regions in the frame of FIG. 5A for use in augmenting the frame of video data. As discussed above, the mask may have been generated by the computing system to exclude pixels corresponding to moving objects and/or foreground objects. FIG. 5F depicts an augmented version 540 of the frame 502 of FIG. 5A that includes advertisement data 542 within detected crowd regions applied based on the mask of FIG. 5E. While the augmentation content is illustrated as opaque, in other instances the augmentation content may appear translucent (e.g., less than 100% opacity) such that individual pixels within the display position of the augmentation content have color values based on a blend of the original captured scene's pixel color value and the augmentation content's pixel color value.

Figure 6A:
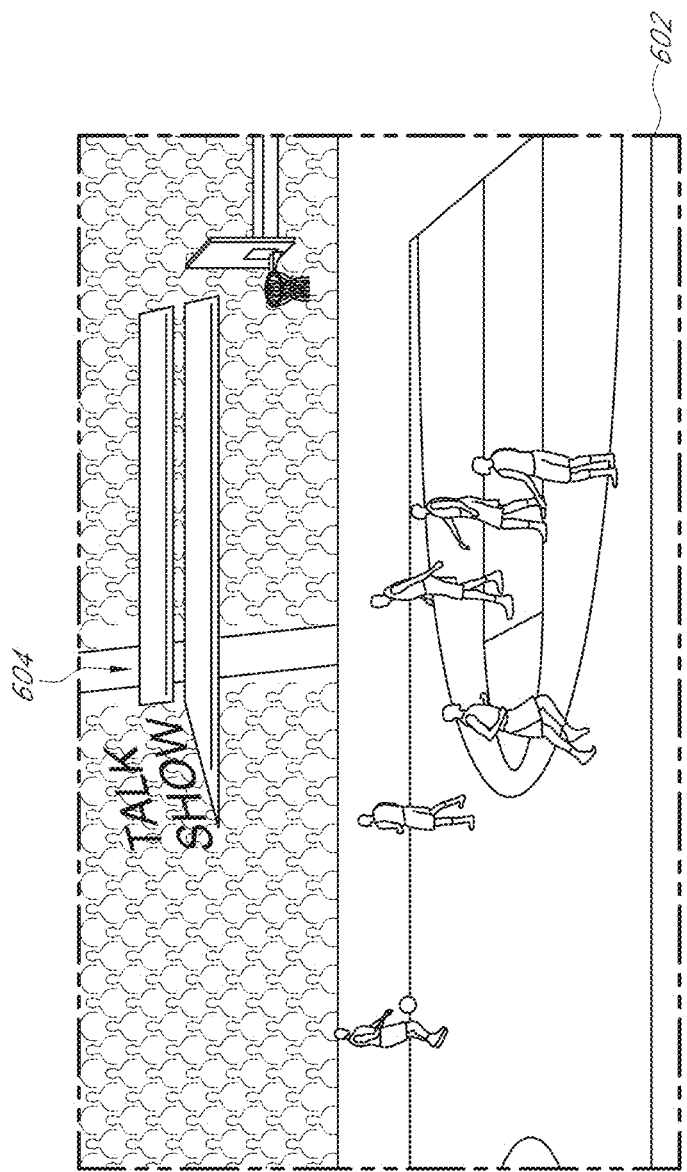
FIG. 6A depicts an augmented frame of video data from a basketball game in which advertisement content has been superimposed within a crowd region.
Figure 6B:
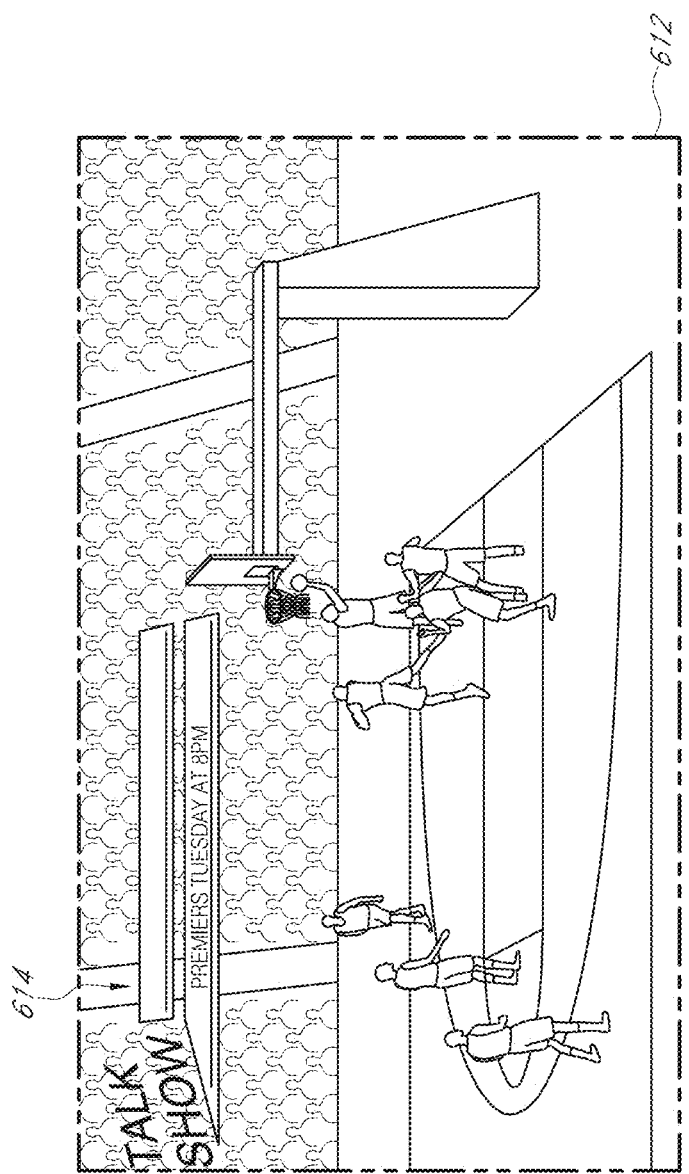
FIG. 6B depicts an additional augmented frame of video data from the basketball game of FIG. 6A in which superimposed advertisement content appears in a different portion of the frame to track a new location of the associated crowd region.

FIG. 6A depicts an augmented frame 602 of video data from a basketball game in which advertisement content 604 has been superimposed within a crowd region to match a pose of the crowd region. FIG. 6B depicts an additional augmented frame 612 of video data from the basketball game of FIG. 6A in which superimposed advertisement content 614 appears in a different portion of the frame to track a new location of the associated crowd region. In a number of frames between frame 602 and 612 (e.g., an eight second period), the camera may have panned to its right and zoomed in to follow the on-court action, while the advertisement content appeared to be "pegged" to a specific portion of the crowd as though the superimposed advertisement was actually projected on the same real world objects (people and stands) consistently throughout each frame. The advertisement content may animate or appear as a continuous video throughout its appearance, and may visually fade in and out before and after (respectively) its inclusion in the augmented feed. The augmentation may occur in real time as the live game is broadcast, such that the advertisement appears in the live television feed, or may be added later (such as when a highlight from the game is posted to social media or at the time an individual user selects to view a clip via an on-demand video service or Internet source).

As has been described above, one embodiment may include a computing system comprising a memory and a processor in communication with the memory and configured with processor-executable instructions to perform operations. The operations may include: receiving at least a frame of video data depicting a real world scene captured by a video camera; identifying, using a machine learning model, one or more objects depicted within the frame, wherein the one or more objects comprise background content that is not a primary focus of the video; determining a position within the frame of a candidate region for visual augmentation, wherein the candidate region includes at least one of the one or more objects; estimating depth information for each of a plurality of individual pixels or objects in the candidate region; fitting a planar surface to the candidate region based at least in part on the depth information; retrieving visual augmentation content; generating rendered visual augmentation content, wherein generating the rendered visual augmentation content comprises rendering the visual augmentation content in virtual three-dimensional space to have a position and pose corresponding to the planar surface; and augmenting the frame to include the rendered visual augmentation content within the candidate region to form an augmented video frame.

In some embodiments, the above operations further comprise, prior to rendering the visual augmentation, estimating a three-dimensional position and pose of the video camera that captured the frame. The operations may further comprise receiving a second frame of video data captured by the video camera subsequent to the frame; tracking a new position of the at least one of the one or more objects in the second frame; based at least in part on the new position of the at least one of the one or more objects, determining an updated position within the second frame of an updated candidate region for visual augmentation, wherein the updated position within the second frame of an updated candidate region is different than the position within the frame of the candidate region; and augmenting the second frame to include an updated rendering of the visual augmentation content at the updated position within the second frame.

The above operations may further comprise continuing to augment successive frames of the video data with updated renderings of the augmentation content until a new shot is detected or position tracking fails. In other embodiments, the operations further comprise rendering the visual augmentation content within each of a plurality of frames that were captured during a panning or zooming action by the video camera, wherein the visual augmentation content rendered within each of the plurality of frames appears to maintain a consistent real world position within the real world scene while an in-frame position of the rendering of the visual augmentation content varies between individual frames of the plurality of frames.

According to another embodiment, a computer may implement a method. The method may include: receiving at least a frame of video data depicting a real world scene captured by a video camera; identifying, within the frame, a candidate region for visual augmentation, wherein the candidate region is identified based at least in part on output of a machine learning model and preset criteria for visual augmentation; estimating depth information for each of a plurality of individual pixels or objects in the candidate region; retrieving visual augmentation content; rendering the visual augmentation content in virtual three-dimensional space to form rendered visual augmentation content, wherein the rendered visual augmentation content has a position and pose corresponding to one or more portions of the real world scene captured in the frame based at least in part on the depth information; and augmenting the frame to include the rendered visual augmentation content within the candidate region to form an augmented video frame.

In some embodiments, the machine learning model is a convolutional neural network. In another embodiment, the candidate region is identified based at least in part on a determination by the machine learning model that the candidate region comprises a preset type of real world area or preset type of real world object. In one embodiment, the real world scene is a sporting event, the preset type of real world area is a crowd of people, and the machine learning model is trained to identify crowds of people. In one embodiment, the preset type of real world area or preset type of real world object comprises one of background landscape, sky or ground.

In one embodiment, the method may further include, prior to augmenting the frame, generating mask data identifying pixels for augmentation within the candidate region, wherein augmenting the frame includes placing pixels of the rendered visual augmentation content at pixel locations of the frame based on the mask data. In another embodiment, the method may further include, prior to identifying the candidate region, generating a user interface for presentation to a rights holder associated with the video data, wherein the user interface enables the rights holder to approve the preset type of real world area or preset type of real world object for augmentation. In another embodiment, the method may include determining the preset type of real world area or preset type of real world object to present to the rights holder based at least in part on an automated analysis of previously captured video content associated with the rights holder, wherein the automated analysis includes identifying underutilized areas of frames of the previously captured video content.

Also disclosed is a non-transitory computer readable medium storing computer executable instructions that, when executed by one or more computer systems, configure the one or more computer systems to perform operations. The operations may include: receiving at least a frame of video data depicting a real world scene captured by a video camera; identifying, within the frame, a candidate region for visual augmentation, wherein the candidate region is identified based at least in part on output of a machine learning model; estimating depth information for each of a plurality of individual pixels or objects in the candidate region; retrieving visual augmentation content; rendering the visual augmentation content in virtual three-dimensional space to form rendered visual augmentation content, wherein the rendered visual augmentation content has a position and pose corresponding to one or more portions of the real world scene captured in the frame based at least in part on the depth information; and augmenting the frame to include the rendered visual augmentation content within the candidate region to form an augmented video frame.

The operations may further include augmenting successive frames of the video data with updated renderings of the augmentation content, wherein each of the updated renderings is included at an updated position in an individual successive frame, wherein the updated position tracks a new position of at least one real-world object within the individual successive frame.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing system comprising:
   a memory; and
   a processor in communication with the memory and configured with processor-executable instructions to perform operations comprising:
      receiving at least a frame of video data depicting a real world scene captured by a video camera;
      identifying, using a machine learning model trained to identify clusters of people depicted in image or video data, one or more clusters of people depicted within the frame, wherein the one or more clusters of people comprise background content that is not a primary focus of the video;
      identifying, within the frame, a candidate region for visual augmentation, wherein the candidate region includes at least one of the one or more clusters of people;
      identifying, within the frame, an additional candidate region that meets criteria for associating the additional candidate region with at least the candidate region for visual augmentation, wherein the criteria is met based at least in part on (a) a first determination that the additional candidate region is within a predefined proximity of the candidate region within the frame and (b) a second determination that a predefined size relationship is met between the candidate region and the additional candidate region;
      estimating depth information for each of a plurality of individual pixels or objects in at least the candidate region;
      fitting a planar surface to at least the candidate region based at least in part on the depth information;
      retrieving visual augmentation content identified in a data store as intended for presentation across at least two associated regions;
      generating rendered visual augmentation content, wherein generating at least a first portion of the rendered visual augmentation content comprises rendering at least a portion of the visual augmentation content in virtual three-dimensional space to have a position and pose corresponding to the planar surface; and
      augmenting the frame to include the rendered visual augmentation content, wherein augmenting the frame to include the rendered visual augmentation content comprises including (a) the first portion of the rendered visual augmentation content in the candidate region and (b) a second portion of the rendered visual augmentation content in the additional candidate region.

2. The computing system of claim 1, wherein the operations further comprise, prior to rendering the visual augmentation, estimating a three-dimensional position and pose of the video camera that captured the frame.

3. The computing system of claim 1, wherein the operations further comprise:
   receiving a second frame of video data captured by the video camera subsequent to the frame;
   tracking a new position of the at least one of the one or more clusters of people in the second frame;
   based at least in part on the new position of the at least one of the one or more clusters of people, determining an updated position within the second frame of an updated candidate region for visual augmentation, wherein the updated position within the second frame of an updated candidate region is different than a position within the frame of the candidate region; and
   augmenting the second frame to include an updated rendering of at least a portion of the visual augmentation content at the updated position within the second frame.

4. The computing system of claim 3, wherein the operations further comprise continuing to augment successive frames of the video data with updated renderings of the augmentation content until a new shot is detected or position tracking fails.

5. The computing system of claim 1, wherein the operations further comprise rendering the visual augmentation content within each of a plurality of frames that were captured during a panning or zooming action by the video camera, wherein the visual augmentation content rendered within each of the plurality of frames appears to maintain a consistent real world position within the real world scene while an in-frame position of the rendering of the visual augmentation content varies between individual frames of the plurality of frames.

6. The computing system of claim 1, wherein the real world scene comprises a sporting event, wherein the one or more clusters of people comprise spectators at the sporting event.

7. A computer-implemented method comprising:
   receiving at least a frame of video data depicting a real world scene captured by a video camera;

identifying, within the frame, a candidate region for visual augmentation, wherein the candidate region is identified based at least in part on output of a machine learning model;

identifying, within the frame, an additional candidate region that meets criteria for associating the additional candidate region with at least the candidate region for visual augmentation, wherein the criteria is met based at least in part on (a) a first determination that the additional candidate region is within a predefined proximity of the candidate region within the frame and (b) a second determination that a predefined size relationship is met between the candidate region and the additional candidate region;

estimating depth information for each of a plurality of individual pixels or objects in at least the candidate region;

retrieving visual augmentation content identified in a data store as intended for presentation across at least two associated regions;

rendering the visual augmentation content in virtual three-dimensional space to form rendered visual augmentation content, wherein the rendered visual augmentation content has a position and pose corresponding to one or more portions of the real world scene captured in the frame based at least in part on the depth information; and augmenting the frame to include the rendered visual augmentation content, wherein augmenting the frame to include the rendered visual augmentation content comprises including (a) a first portion of the rendered visual augmentation content in the candidate region and (b) a second portion of the rendered visual augmentation content in the additional candidate region.

8. The computer-implemented method of claim 7, wherein the machine learning model is a convolutional neural network.

9. The computer-implemented method of claim 7, wherein the candidate region is identified based at least in part on a determination by the machine learning model that the candidate region comprises a preset type of real world area or preset type of real world object.

10. The computer-implemented method of claim 9, wherein the real world scene is a sporting event, wherein the preset type of real world area is a crowd of people.

11. The computer-implemented method of claim 9, wherein the preset type of real world area or preset type of real world object comprises one of background landscape, sky or ground.

12. The computer-implemented method of claim 9, further comprising, prior to identifying the candidate region, generating a user interface for presentation to a rights holder associated with the video data, wherein the user interface enables the rights holder to approve the preset type of real world area or preset type of real world object for augmentation.

13. The computer-implemented method of claim 12, further comprising determining the preset type of real world area or preset type of real world object to present to the rights holder based at least in part on an automated analysis of previously captured video content associated with the rights holder, wherein the automated analysis includes identifying underutilized areas of frames of the previously captured video content.

14. The computer-implemented method of claim 7, further comprising, prior to augmenting the frame, generating mask data identifying pixels for augmentation within the candidate region, wherein augmenting the frame includes placing pixels of the rendered visual augmentation content at pixel locations of the frame based on the mask data.

15. The computer-implemented method of claim 7, wherein the machine learning model is trained to identify clusters of people, wherein the candidate region is identified as including at least one cluster of people based on output of the machine learning model.

16. The computer-implemented method of claim 7, wherein the criteria is met based at least in further part on a comparison of a first pose of the additional candidate region with a second pose of the candidate region.

17. A non-transitory computer readable medium storing computer executable instructions that, when executed by one or more computer systems, configure the one or more computer systems to perform operations comprising:

receiving at least a frame of video data depicting a real world scene captured by a video camera;

identifying, within the frame, a candidate region for visual augmentation, wherein the candidate region is identified based at least in part on output of a machine learning model;

identifying, within the frame, an additional candidate region that meets criteria for associating the additional candidate region with at least the candidate region for visual augmentation, wherein the criteria is met based at least in part on (a) a first determination that the additional candidate region is within a predefined proximity of the candidate region within the frame and (b) a second determination that a predefined size relationship is met between the candidate region and the additional candidate region;

estimating depth information for each of a plurality of individual pixels or objects in at least the candidate region;

retrieving visual augmentation content identified in a data store as intended for presentation across at least two associated regions;

rendering the visual augmentation content in virtual three-dimensional space to form rendered visual augmentation content, wherein the rendered visual augmentation content has a position and pose corresponding to one or more portions of the real world scene captured in the frame based at least in part on the depth information; and augmenting the frame to include the rendered visual augmentation content to form an augmented video frame, wherein augmenting the frame to include the rendered visual augmentation content comprises including (a) a first portion of the rendered visual augmentation content in the candidate region and (b) a second portion of the rendered visual augmentation content in the additional candidate region.

18. The non-transitory computer readable medium of claim 17, wherein the operations further comprise augmenting successive frames of the video data with updated renderings of the augmentation content, wherein each of the updated renderings is included at an updated position in an individual successive frame, wherein the updated position tracks a new position of at least one real-world object within the individual successive frame.

19. The non-transitory computer readable medium of claim 17, wherein the machine learning model is trained to identify clusters of individual people present in the real world scene, wherein the candidate region is identified as including at least one cluster of people.

20. The non-transitory computer readable medium of claim 17, wherein the predefined size relationship is met based on a determination that the candidate region and the additional candidate region are equally sized as each other.

* * * * *